US007379398B2

(12) United States Patent
Shimamoto et al.

(10) Patent No.: US 7,379,398 B2
(45) Date of Patent: May 27, 2008

(54) OPTICAL DISC APPARATUS, AN OPTICAL DISC METHOD, AND A SEMICONDUCTOR INTEGRATED CIRCUIT CAPABLE OF ADJUSTING A FOCUS POSITION OF A LIGHT BEAM AND A SPHERICAL ABERRATION

(75) Inventors: Takeshi Shimamoto, Osaka (JP); Shin-ichi Yamada, Osaka (JP); Shin-ichi Kadowaki, Hyogo (JP); Yuuichi Kuze, Osaka (JP); Kenji Kondo, Osaka (JP); Katsuya Watanabe, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 583 days.

(21) Appl. No.: 11/006,179

(22) Filed: Dec. 7, 2004

(65) Prior Publication Data

US 2005/0141363 A1 Jun. 30, 2005

(30) Foreign Application Priority Data

Dec. 8, 2003 (JP) .............................. 2003-408597

(51) Int. Cl.
    *G11B 7/00* (2006.01)
(52) U.S. Cl. ............................ 369/44.29; 369/44.23; 369/53.31
(58) Field of Classification Search ..................... None
    See application file for complete search history.

(56) References Cited

U.S. PATENT DOCUMENTS 6,124,988 A * 9/2000 Yanagisawa et al. ........ 359/719
6,643,230 B2 * 11/2003 Furukawa ................. 369/44.23
7,038,995 B2 * 5/2006 Kitamura et al. ......... 369/112.24
7,042,817 B2 * 5/2006 Tadano et al. ............ 369/44.23
7,050,378 B2 * 5/2006 Itonaga ................... 369/112.08
7,102,980 B2 * 9/2006 Saito et al. ............. 369/112.07
2002/0172110 A1 11/2002 Tateishi et al.
2003/0202437 A1 * 10/2003 Yamada et al. ........... 369/44.29

FOREIGN PATENT DOCUMENTS

EP 1318507 A2 * 6/2003
JP 2002-342952 11/2002

* cited by examiner

*Primary Examiner*—William Korzuch
*Assistant Examiner*—Peter Vincent Agustin
(74) *Attorney, Agent, or Firm*—Renner, Otto, Boisselle & Sklar, LLP

(57) ABSTRACT

An optical disc apparatus includes a control section. The control section performs a first search while the tracking control is in the off state. The first search is for searching for a plurality of sets of the focus positions of the light beam and the spherical aberration amounts such that an amplitude of the tracking error signal is greater than a predetermined value. The control section performs a second search while the tracking control is in the on state. The second search is for determining a set of the focus position of the light beam and the spherical aberration amount such that the reproduced signal quality index is substantially optimal, among the plurality of sets of the focus positions of the light beam and the spherical aberration amounts obtained in the first search.

20 Claims, 21 Drawing Sheets

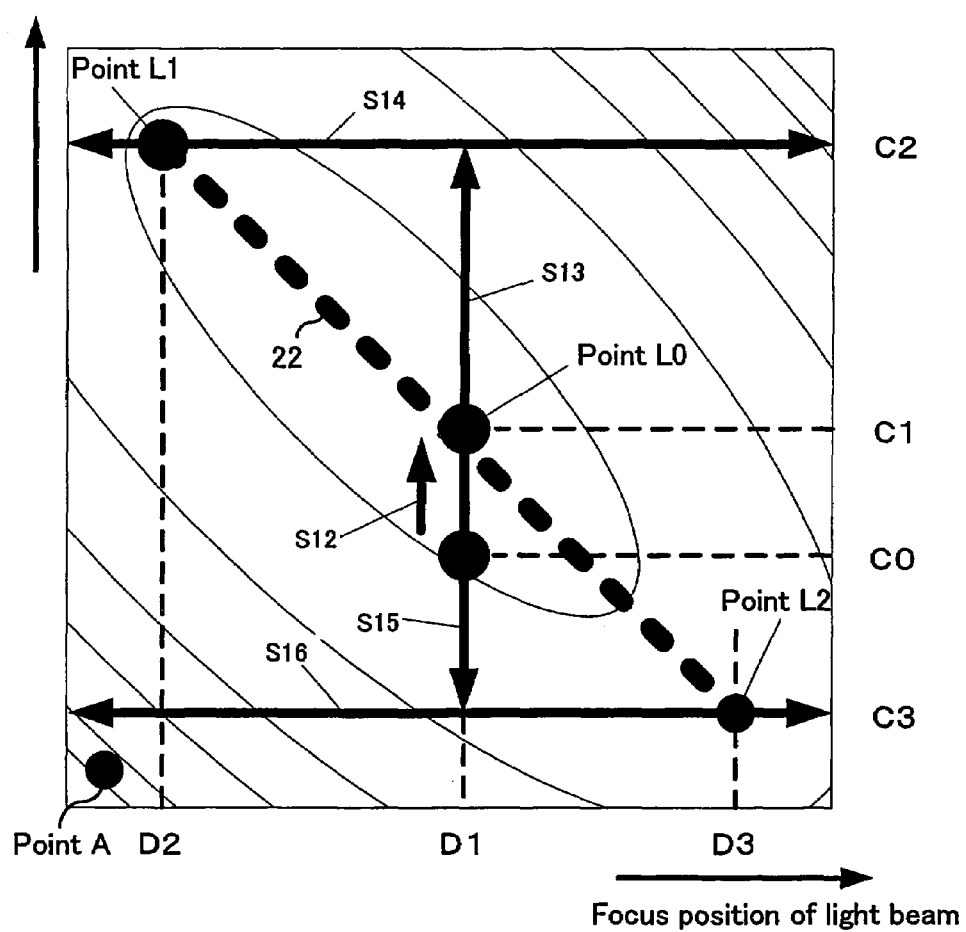

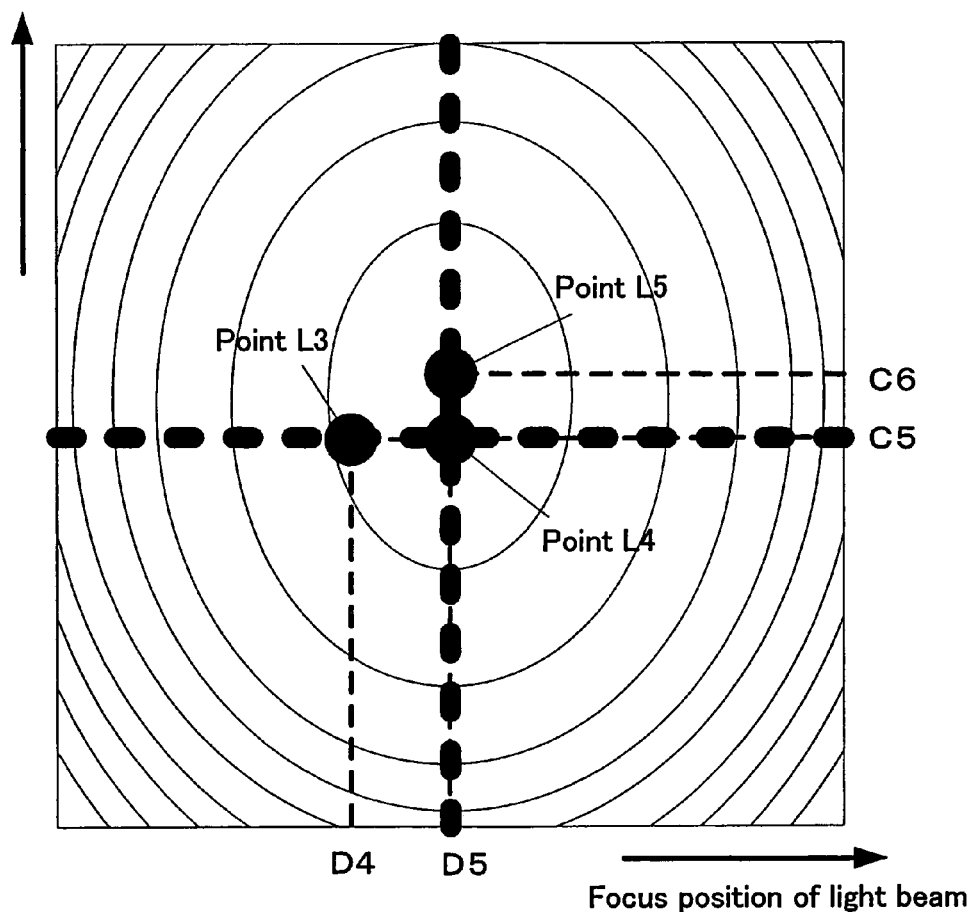

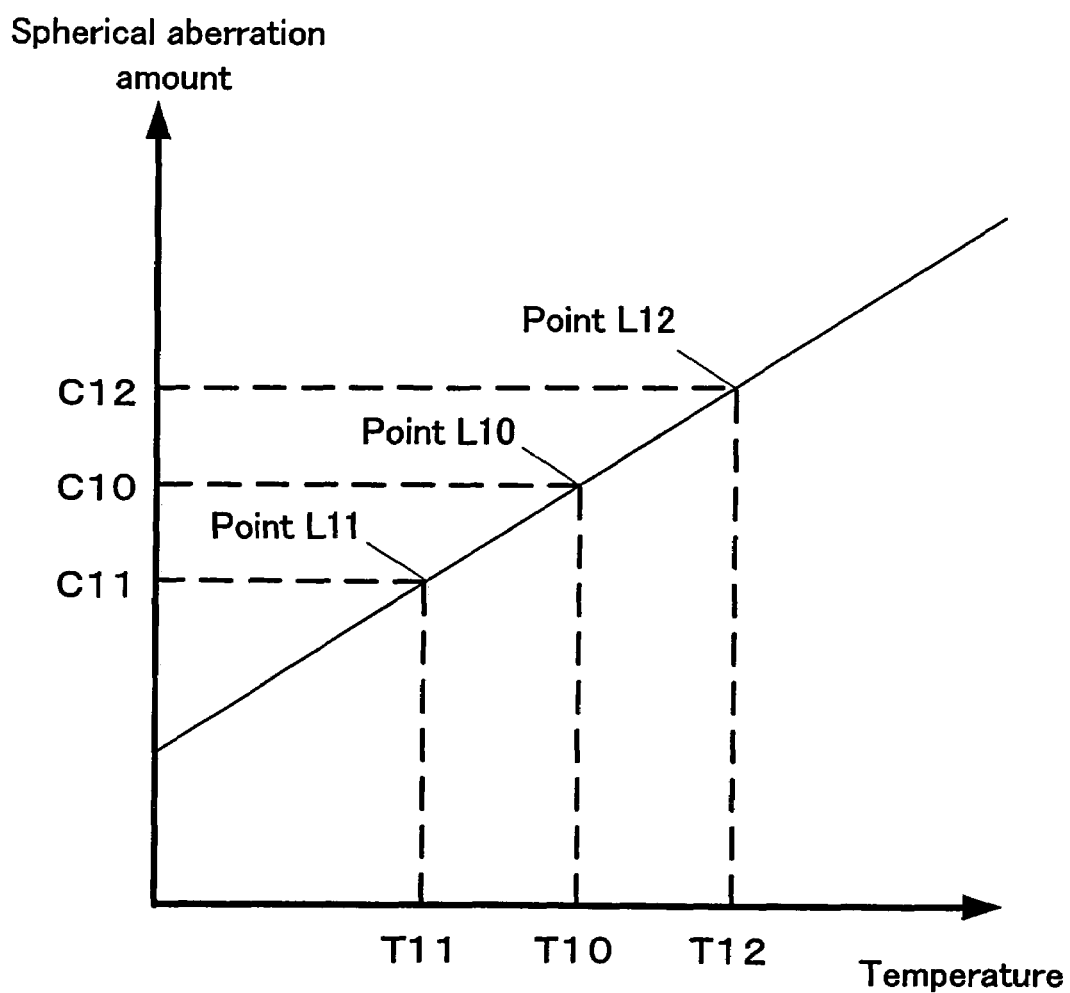

OPTICAL DISC APPARATUS, AN OPTICAL DISC METHOD, AND A SEMICONDUCTOR INTEGRATED CIRCUIT CAPABLE OF ADJUSTING A FOCUS POSITION OF A LIGHT BEAM AND A SPHERICAL ABERRATION

BACKGROUND OF THE INVENTION

1. Field of the Invention

The present invention relates to an optical disc apparatus, an optical disc method and a semiconductor integrated circuit capable of performing a recording or reproduction at a high density for an optical disc by accurately adjusting a focus position of a light beam and a spherical aberration amount.

2. Description of the Related Art

As a method for increasing the recording density for an optical disc, a method for reducing the size of a spot of a light beam formed on an information surface of the optical disc is known. The reduction of the size of the spot of the light beam formed on the information surface of the optical disc is achieved by increasing a numeral aperture (NA) of the light beam and decreasing a wavelength of the light beam.

However, when a numeral aperture (NA) of the light beam is increased and a wavelength of the light beam is decreased, a spherical aberration amount generated due to an error in the thickness of the protection layer of the optical disc is increased rapidly. Accordingly, it is required to provide means for correcting the spherical aberration amount.

FIG. 14a and FIG. 14b are views for explaining a spherical aberration.

FIG. 14a shows a state where the thickness from the surface of the optical disc 13 to the information surface 15 is optimal so that no spherical aberration amount is generated on the information surface 15.

A light beam emitted from a laser source is refracted by a protection layer 14 of the optical disc 13 in a state where the focus control is operated. As a result, an outer portion of the light beam is converged into a focus point B and an inner portion of the light beam is converged into a focus point C. A position A is located on a line connecting the focus point B and the focus point C, and is also located on the information surface 15. Since no spherical aberration amount is generated on the information surface 15 of the optical disc 13, both the focus point B of the outer portion of the light beam and the focus point C of the inner portion of the light beam conform with the position A. That is, a surface which has an equivalent distance from the position A conforms with a wave surface of the light beam.

FIG. 14b shows a state where the thickness from the surface of the optical disc 13 to the information surface 15 is insufficiently small and a spherical aberration amount is generated on the information surface 15.

Since the thickness from the-surface of the optical disc 13 to the information surface 15 (i.e. the thickness of the protection layer 14) is small, the influence of the spherical aberration amount is large. The focus point B and the focus point C are separated from each other. The two focus points B and C are in a defocus state with respect to the position A of the information surface 15 onto which the light beam is to be converged. The position A is located on the information layer 15 since the FE signal is generated without separating the outer portion of the light beam with the inner portion of the light beam and the focus control is operated such that the FE signal becomes almost zero. A wave surface of the light beam does not conform with a surface which has an equivalent distance from the position A.

In FIG. 14b, a solid line indicates the inner portion and the outer portion of the light beam in the state where the spherical aberration is generated, and a dotted line indicates the inner portion and the outer portion of the light beam in the state where the spherical aberration is not generated.

When the thickness as defined from the surface of the optical disc 13 to the information surface 15 is greater than the thickness shown in FIG. 14a, the focus point B and the focus point C are separated from each other, and the two focus points B and C are in a defocus state with respect to the position A of the information surface 15 onto which the light beam is to be converged in a similar way to the case shown in FIG. 14b.

Thus, a phenomena in which the focus point B of the outer portion of the light beam and the focus point C of the inner portion of the light beam are separated from each other is referred to as a "spherical aberration". The amount of the spherical aberration is referred to as a spherical aberration amount or a spherical aberration generation amount.

FIG. 8 shows a procedure of a conventional method for adjusting the focus position of the light beam and the spherical aberration amount, which is described in Japanese laid-open publication No. 2002-342952 (pages 4-6, FIG. 1).

A servo control including a focus control, a tracking control and a disc motor servo is started (ON) at step S31. Next, a multi-dimensional search routine is performed at step S32 in order to correct the focus position of the light beam and the spherical aberration amount. Under the control of the microcomputer, the focus position of the objective lens is wobbled in accordance with a focus disturbance signal. In parallel to this, a spherical aberration correction disturbance signal is supplied to the spherical aberration correction driving circuit. As a result, a spherical aberration correction amount is wobbled. Such a search is performed in a multi-dimensional space (two-dimensions and eight directions) as shown in FIG. 9, so that the focus position of the light beam and the spherical aberration correction amount are sequentially adjusted to increase an envelope signal of the RF signal.

However, during the process for adjusting the focus position of the light beam and the spherical aberration amount, there may be a case where the amplitude of the tracking error signal (TE signal) is reduced rapidly and the tracking control becomes unstable.

FIG. 10 shows the characteristic of an envelope signal of the RF signal with respect to the focus position of the light beam and the spherical aberration amount. In FIG. 10, the lateral axis indicates a focus position of the light beam and the vertical axis indicates a spherical aberration amount generated in a spot of the light beam formed on the information surface 15 of the optical disc 13. The value of the envelope signal is represented by a contour line map including a plurality of concentric ellipses. The value of the envelope signal on a contour line is constant. The value of the envelope signal becomes higher as the point on the map approaches the center of each ellipse. Accordingly, the value the envelope signal becomes maximum at approximately the center of each ellipse.

FIG. 2b shows the amplitude characteristic of the TE signal with respect to the focus position of the light beam and the spherical aberration amount. The lateral axis and the vertical axis shown in FIG. 2b are the same as those shown in FIG. 10. The amplitude level of the TE signal is represented by a contour line map including a plurality of concentric ellipses. The amplitude level of the TE signal on a contour line is constant. The amplitude level of the TE signal becomes higher as the point on the map approaches the center of each ellipse. Accordingly, the amplitude level of the TE signal becomes maximum at approximately the center of each ellipse.

According to the conventional method, during the process for adjusting the focus position of the light beam and the spherical aberration amount such that the envelop signal of the RF signal becomes maximum, there may be a case where the tracking control becomes unstable and the adjustment is terminated unsuccessfully.

For example, in a case where the search is started from a point A shown in FIG. 2b or the point approaches the point A during the search, the amplitude of the TE signal is extremely reduced, and the gain of the tracking control system is reduced. Accordingly, there may be a case where a control residual is increased or the tracking control system is oscillated.

One of the purposes of the present invention is to provide an optical disc apparatus, an optical disc method and a semiconductor integrated circuit capable of adjusting the focus position of the light beam and the spherical aberration amount such that the reproduced signal quality becomes optimal while maintaining the stability of the tracking control.

SUMMARY OF THE INVENTION

An optical disc apparatus of the present invention includes: a focus position changing section operable to change a focus position of a light beam with which an optical disc is irradiated; a spherical aberration amount changing section operable to change a spherical aberration amount which is generated in a spot of the light beam formed on an information surface of the optical disc; a tracking error detecting section for detecting a tracking error indicating a positional shift between the spot of the light beam and a track on the information surface of the optical disc and generating a tracking error signal indicating the tracking error; a tracking control section for performing a tracking control in accordance with the tracking error signal; a reproduced signal quality index generating section for generating a reproduced signal quality index indicating a quality of a reproduced signal from the information surface of the optical disc; and a control section for controlling the focus position changing section, the spherical aberration amount changing section and the tracking control section; wherein the control section is operable to switch an on/off state of the tracking control, the control section performs a first search while the tracking control is in the off state, the first search for searching for a plurality of sets of the focus positions of the light beam and the spherical aberration amounts such that an amplitude of the tracking error signal is greater than a predetermined value by controlling the focus position changing section to change the focus position of the light beam and controlling the spherical aberration amount changing section to change the spherical aberration amount, and the control section performs a second search while the tracking control is in the on state, the second search for determining a set of the focus position of the light beam and the spherical aberration amount such that the reproduced signal quality index is substantially optimal, among the plurality of sets of the focus positions of the light beam and the spherical aberration amounts obtained in the first search.

An optical disc apparatus of the present invention includes: a focus position changing section operable to change a focus position of a light beam with which an optical disc is irradiated; a spherical aberration amount changing section operable to change a spherical aberration amount which is generated in a spot of the light beam formed on an information surface of the optical disc; a tracking error detecting section for detecting a tracking error indicating a positional shift between the spot of the light beam and a track on the information surface of the optical disc and generating a tracking error signal indicating the tracking error; a tracking control section for performing a tracking control in accordance with the tracking error signal; a reproduced signal quality index generating section for generating a reproduced signal quality index indicating a quality of a reproduced signal from the information surface of the optical disc; and a control section for controlling the focus position changing section, the spherical aberration amount changing section and the tracking control section; wherein the control section determines a spherical aberration amount such that the reproduced signal quality index is substantially optimal while the tracking control is in the on state, by controlling the spherical aberration amount changing section to change the spherical aberration amount while maintaining the focus position of the light beam at a predetermined value.

An optical disc apparatus of the present invention includes: a focus position changing section operable to change a focus position of a light beam with which an optical disc is irradiated; a spherical aberration amount changing section operable to change a spherical aberration amount which is generated in a spot of the light beam formed on an information surface of the optical disc; and a control section for controlling the focus position changing section and the spherical aberration amount changing section; wherein the control section controls the spherical aberration amount changing section to change the spherical aberration amount, after it becomes possible to perform recording or reproduction for a user area on the information surface of the optical disc.

According to the present invention, a two-dimensional first search is performed while the tracking control is in the off-state, and then a two dimensional second search is performed while the tracking control is in the on-state (two-dimensional search × two-step search). As a result, the focus position of the light beam and the spherical aberration amount can be adjusted such that the reproduced signal quality becomes optimal while maintaining the stability of the tracking control.

In the first search, a ridge line of the amplitude of the TE signal may be searched. In this case, it is possible to determine the ridge line at a high accuracy.

When the ridge line is shifted from the focus position of the light beam such that the reproduced signal quality becomes optimal, the focus position of the light beam can be adjusted such that the reproduced signal quality becomes optimal.

When the ridge line is shifted from the spherical aberration amount such that the reproduced signal quality becomes optimal, the spherical aberration amount can be adjusted such that the reproduced signal quality becomes optimal.

These and other advantages of the present invention will become apparent to those skilled in the art upon reading and

BRIEF DESCRIPTION OF THE DRAWINGS

FIG. 2b is a view showing the amplitude characteristic of the TE signal with respect to the focus position of the light beam and the spherical aberration amount.

FIG. 2c is a view showing the characteristic of the MLSA signal with respect to the focus position of the light beam and the spherical aberration amount.

FIG. 19 is a view for explaining a method for re-adjusting the spherical aberration amount.

DESCRIPTION OF THE PREFERRED EMBODIMENTS

Hereinafter, embodiments of the present invention will be described with reference to the drawings.

Embodiment 1

Figure 1:
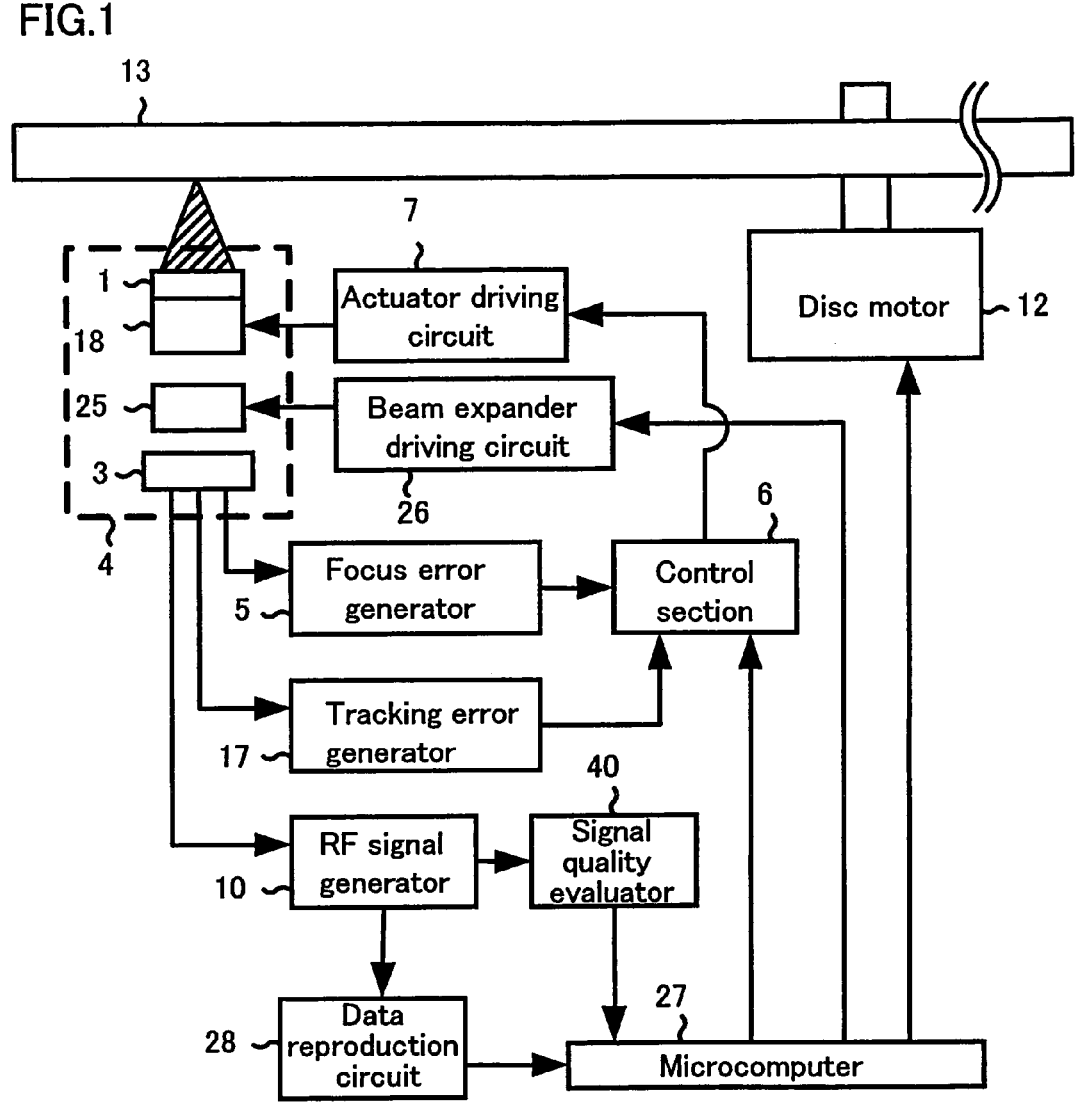
FIG. 1 is a block diagram showing a configuration of an optical disc apparatus according to embodiment 1 of the present invention.

FIG. 1 shows a configuration of an optical disc apparatus according to embodiment 1 of the present invention. The optical disc apparatus records information on an optical disc 13 or reproduces information recorded on the optical disc 13.

A light beam emitted from a laser light source (not shown) provided in an optical pickup 4 is converted into a parallel light beam. The parallel light beam passes through a spherical aberration correction element 25 and is converged into the optical disc 13 by an objective lens 1. A reflected light from the optical disc 13 passes through the objective lens 1 and is detected by a light receiving section 3. The rotation of the optical disc 13 is driven by a disc motor 12.

The light receiving section 3 converts the reflected light from the optical disc 13 into an electric signal. The output of the light receiving section 3 is supplied to a focus error generator 5, a tracking error generator 17 and an RF signal generator 10.

The focus error generator 5 detects a focus error indicating a positional shift between a focus position of the light beam with which the optical disc 13 is irradiated and an information surface of the optical disc 13 based on the output of the light receiving section 3 and generates a focus error signal indicating the focus error. The focus error signal is referred to as a FE signal. The FE signal can be generated using a focus error detection method which is generally called an "astigmatism method", for example.

The tracking error generator 17 detects a tracking error indicating a positional shift between a spot of the light beam formed on the information surface of the optical disc 13 and a track on the information surface of the optical disc 13 based on the output of the light receiving section 3 and generates a tracking error signal indicating the tracking error. The tracking error signal is referred to as a TE signal. The TE signal can be generated using a tracking error detection method which is generally called a "push-pull method", for example.

The RF signal generator 10 generates an RF signal based on the output of the light receiving section 3. The RF signal is supplied to a signal quality evaluator 40 and a data reproduction circuit 28.

The FE signal and the TE signal is supplied to a control section 6, where the signals are subject to processing such as a phase compensation.

An actuator driving circuit 7 drives an objective lens actuator 18 provided in the optical pickup 4 by supplying a driving signal to the objective lens actuator 18 in accordance with a control signal from the control section 6.

The objective lens actuator 18 drives the objective lens 1 in accordance with the driving signal from the actuator driving circuit 7.

Thus, the control section 6 forms a servo loop for a focus control by controlling the actuator driving circuit 7 which drives the objective lens actuator 18 in accordance with the FE signal. The control section 6 also forms a servo loop for a tracking control by controlling the actuator driving circuit 7 which drives the objective lens actuator 18 in accordance with the TE signal. Thus, the servo controls are performed.

A beam expander driving circuit 26 drives the spherical aberration correction element 25 by supplying a driving signal to the spherical aberration correction element 25 in accordance with a control signal from a microcomputer 27.

The spherical aberration correction element 25 changes a spherical aberration amount in a spot of the light beam formed on the information surface of the optical disc 13 in accordance with a driving signal from the beam expander driving circuit 26. The spherical aberration correction element 25 is configured by a beam expander including a concave lens and a convex lens, for example. The beam expander is operable to change a degree of divergence of the light beam by changing an interval between the concave lens and the convex lens, thereby changing a spherical aberration amount in the spot of the light beam.

The beam expander is an example of the spherical aberration correction element 25. However, the spherical aberration correction element 25 is not limited to the beam expander. There may be a case where the spherical aberration correction element 25 does not have any lens. The spherical aberration correction element 25 can have any configuration as far as it implements a function of correcting a spherical aberration generated in the spot of the light beam formed on the information surface of the optical disc 13. For example, the spherical aberration correction element 25 may be an element for correcting a spherical aberration generated in the spot of the light beam by changing a refraction index of a liquid crystal element.

The signal quality evaluator 40 generates a MLSA (Maximum Likelihood Sequence Amplitude) signal from the RF signal. A method for generating the MLSA signal from the RF signal is described in Japanese laid-open publication No. 2003-141823 (see page 10), for example. Recently, the MLSA signal is often called a "MLSE (Maximum Likelihood Sequence Error)" signal. The MLSA signal is identical to the MLSE signal. The MLSE signal generated by the signal quality evaluator 40 is supplied to the microcomputer 27.

The data reproduction circuit 28 decodes information recorded on the optical disc 13 based on the RF signal and supplies the decoded information to the microcomputer 27. The decoding of the information is made in accordance with a signal processing method which is generally called a "PRML (Partial Response Maximum Likelihood) method", for example.

The PRML method is one example of a maximum likelihood decoding method. This method is a technique derived by coupling a partial response technique with a maximum likelihood estimation method. This method realizes a high transmission efficiency in a system in which an error in the transmission path error may occur at a high probability.

In the maximum likelihood decoding method, analog data is converted into digital data in view of the occurrence of intersymbol interference due to an error in the transmission path when the recording density is high. The MLSA (Maximum Likelihood Sequence Amplitude) signal, described in the above publication, has been proposed as an index for a signal quality evaluation which relates to an error ratio in the decoding according to the PRML. A SAM (Sequence Amplitude Margin) signal can be used as an index for a signal quality evaluation. However, embodiments using the MLSA signal will be described below, since the MLSA signal can represent an error more properly.

The microcomputer 27 generates a focus offset signal for changing the focus position of the objective lens 1 and supplies the focus offset signal to the control section 6. The control section 6 adds the focus offset signal from the microcomputer 27 to the FE signal output from the focus error generator 5 and outputs the resulting signal to the actuator driving circuit 7. The actuator driving circuit 7 changes the focus position of the objective lens 1 in accordance with a signal which is obtained by adding the focus offset signal to the FE signal.

The microcomputer 27 generates a control signal for changing a spherical aberration amount and supplies the control signal to the beam expander driving circuit 26. The beam expander driving circuit 26 drives the spherical aberration correction element 25 in accordance with the control signal from the microcomputer 27. As a result, the spherical aberration amount is changed and the spherical aberration is corrected. Before staring the adjustments of the focus position of the light beam and the spherical aberration amount, the spherical aberration correction element 25 is set such that the spherical aberration amount generated in the spot of the light beam becomes minimum with respect to the standard thickness of the protection layer of the optical disc 13.

The control section 6, the microcomputer 27 and the signal quality evaluator 40 are preferably implemented as one or more digital circuits. The control section 6, the microcomputer 27 and the signal quality evaluator 40 can be integrated into a single semiconductor circuit (or a single semiconductor chip).

Figure 7:
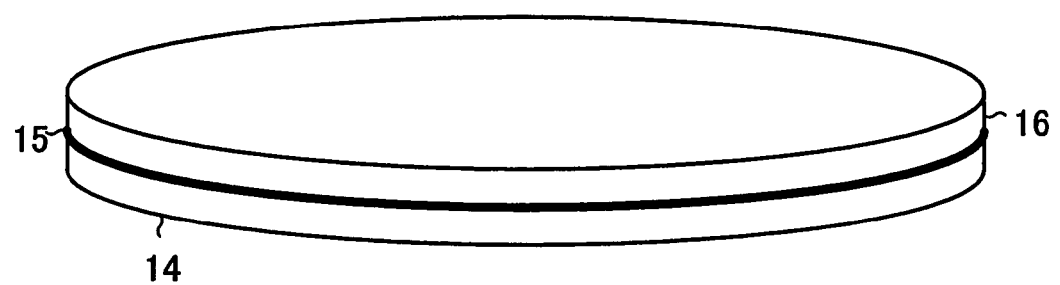
FIG. 7 is a view showing a structure of the optical disc.
Figure 8:
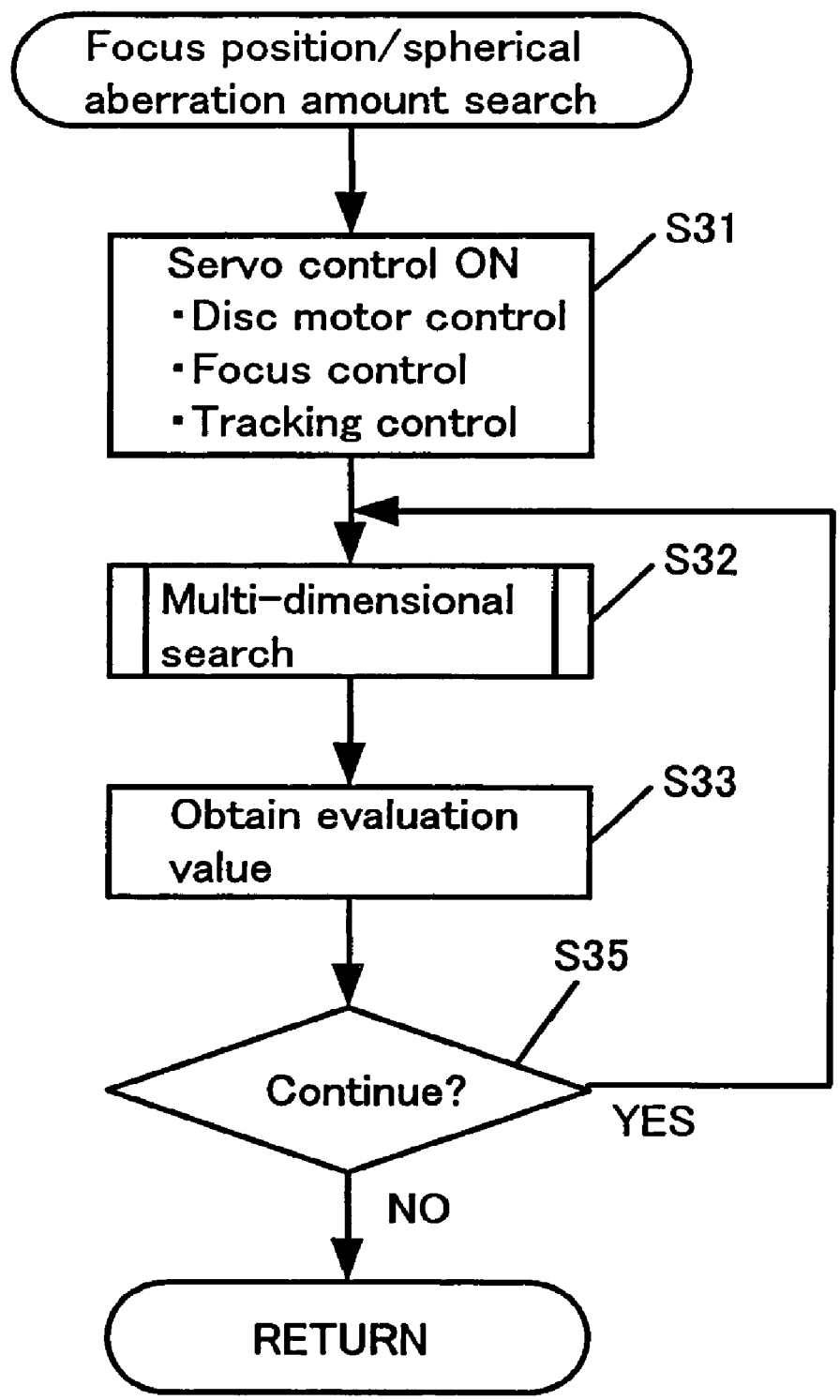
FIG. 8 is a flowchart showing a procedure of a conventional method for adjusting the focus position of the light beam and the spherical aberration amount.
Figure 9:
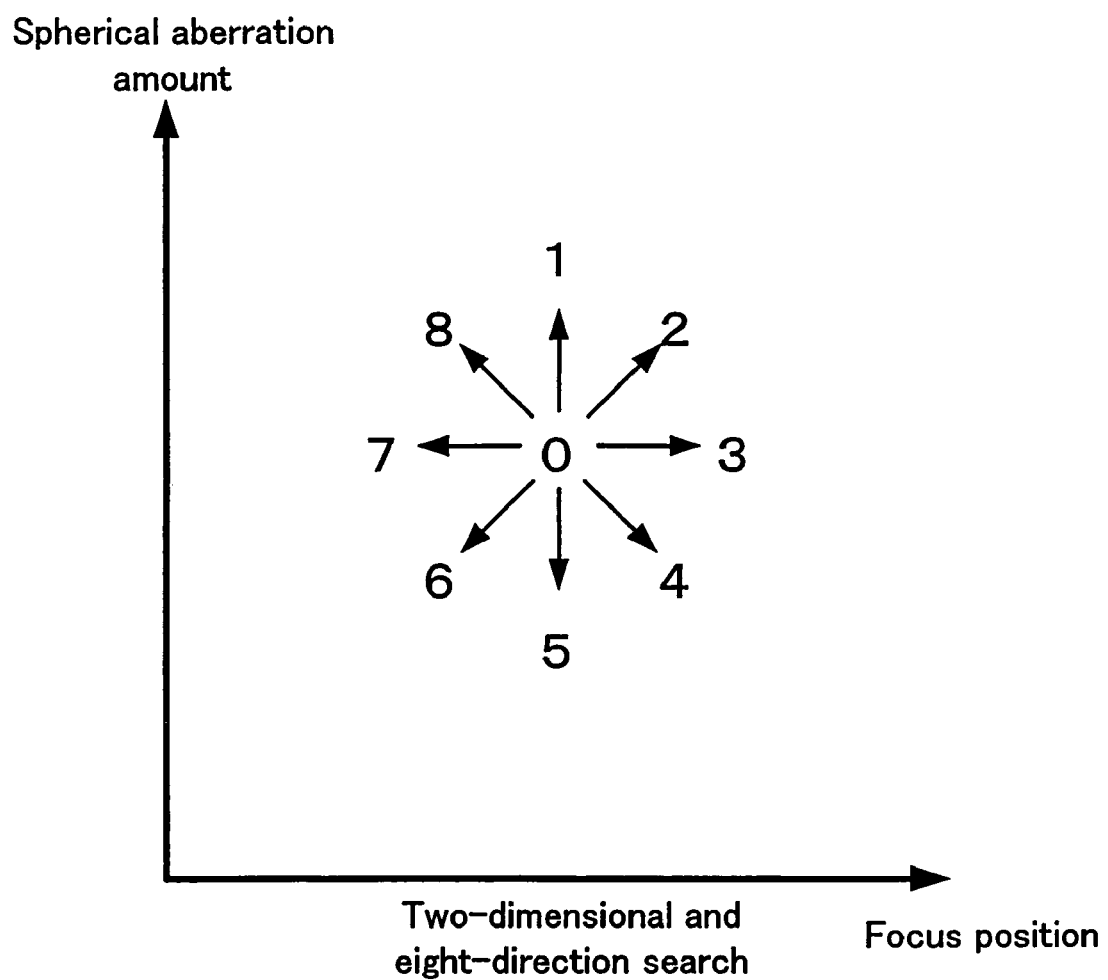
FIG. 9 is a view showing a conventional search direction (two-dimensions and eight-directions) of the focus position of the light beam and the spherical aberration amount.

FIG. 7 shows a structure of the optical disc 13.

The optical disc 13 includes a protection layer 14, an information surface 15 and a substrate 16. The protection layer 14 is a layer for protecting data from scratches and dirt. The protection layer 14 is made of a transparent medium through which the light beam transmits. The information surface 15 is a surface on which data is recorded or reproduced. The substrate 16 is a base member of the optical disc 13. The protection layer 14, the information surface 15 and the substrate 16 are laminated in this order from a side that receives the light beam.

Next, the characteristic of the MLSA signal and the amplitude characteristic of the TE signal with respect to the focus position of the light beam and the spherical aberration amount will be described below.

Figure 2A:
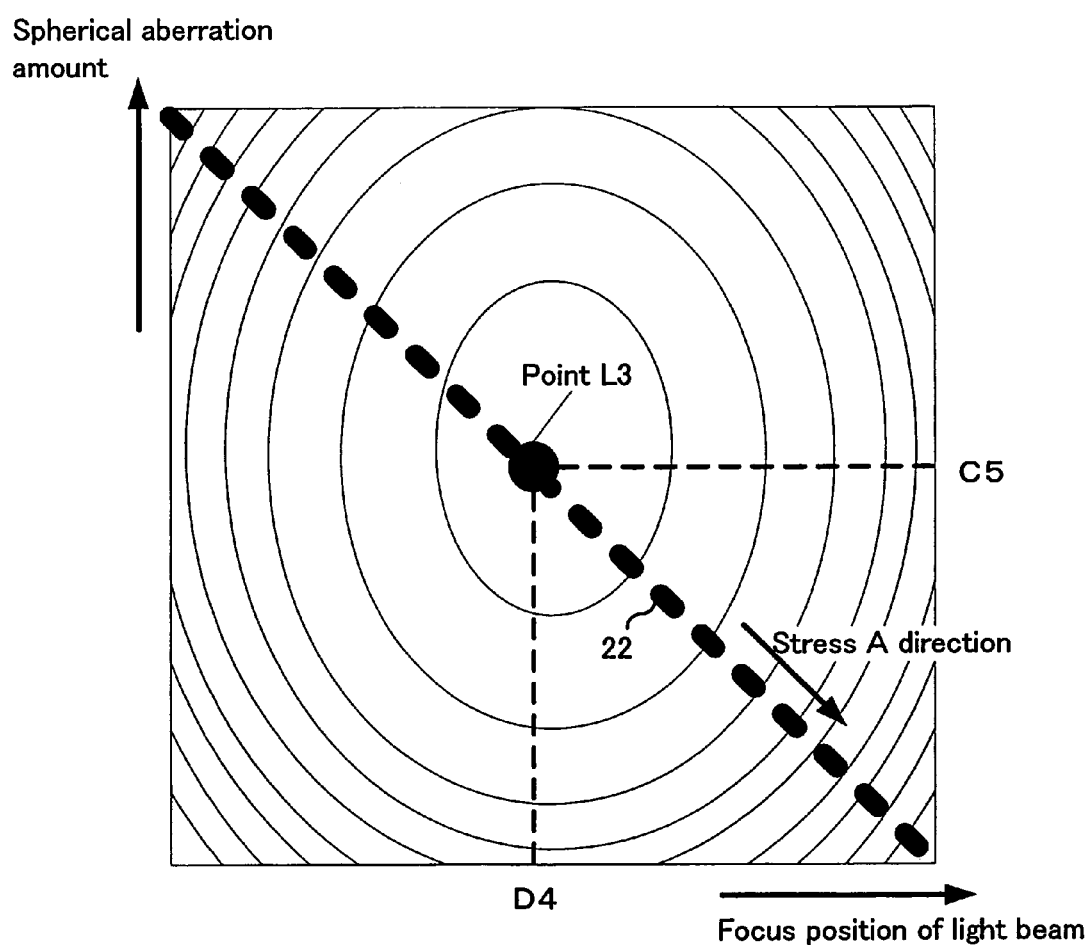
FIG. 2a is a view showing the characteristic of the MLSA signal with respect to the focus position of the light beam and the spherical aberration amount.
Figure 10:
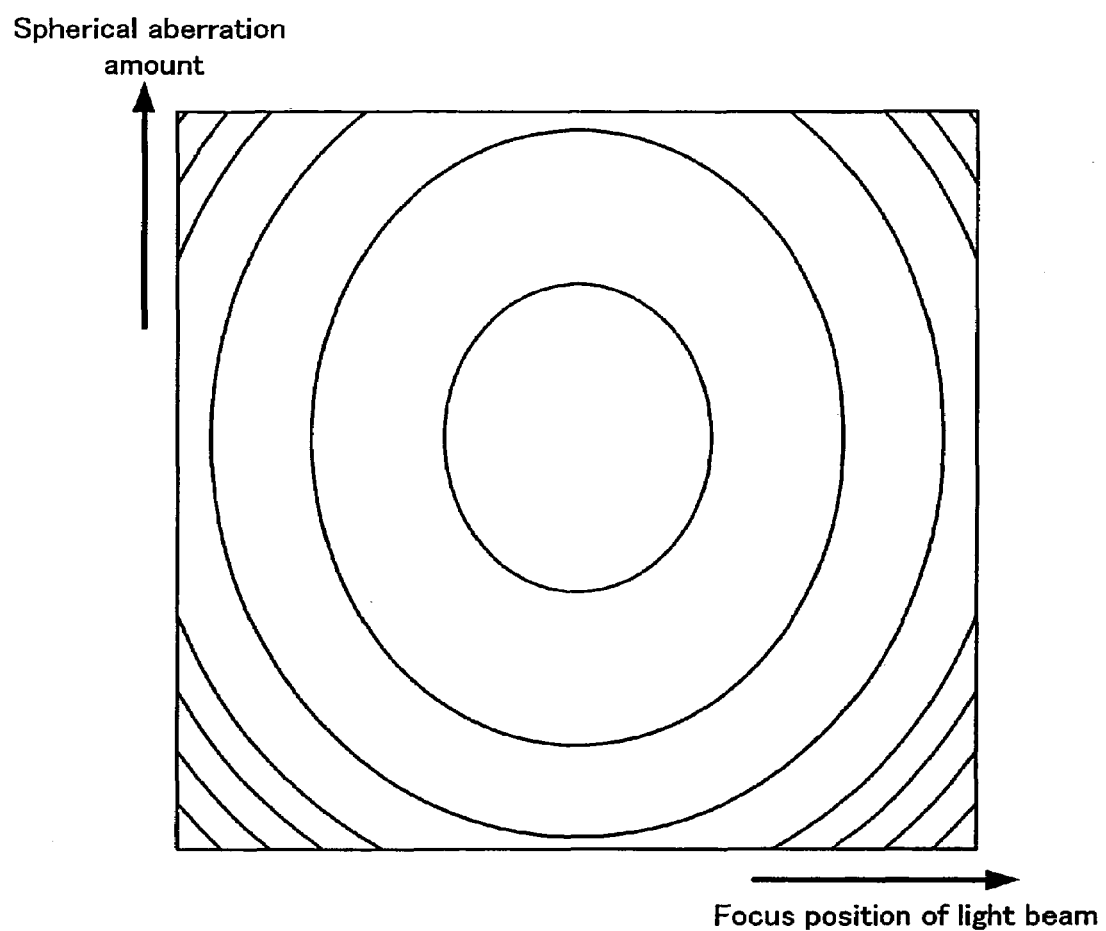
FIG. 10 is a view showing the characteristic of an envelope signal of the RF signal with respect to the focus position of the light beam and the spherical aberration amount.

FIG. 2a shows the characteristic of the MLSA signal of the RF signal with respect to the focus position of the light beam and the spherical aberration amount. The lateral axis and the vertical axis shown in FIG. 2a are the same as those shown in FIG. 10. The value of the MLSA signal is represented by a contour line map including a plurality of concentric ellipses. The value of the MLSA signal on a contour line is constant. The value of the MLSA signal becomes smaller as the point on the map approaches the center of each ellipse. Accordingly, the value of the MLSA signal becomes minimum at approximately the center of each ellipse. A signal can be optimally reproduced using the focus position of the light beam and the spherical aberration amount such that the value of the MLSA signal becomes minimum.

FIG. 2b shows the amplitude characteristic of the TE signal with respect to the focus position of the light beam and the spherical aberration amount. The lateral axis and the vertical axis shown in FIG. 2b are the same as those shown in FIG. 10. The amplitude level of the TE signal is represented by a contour line map including a plurality of concentric ellipses. The amplitude level of the TE signal on a contour line is constant. The amplitude level of the TE signal becomes greater as the point on the map approaches the center of each ellipse. Accordingly, the amplitude level of the TE signal becomes maximum at approximately the center of each ellipse.

When the focus position of the light beam and the spherical aberration amount are independently optimized respectively such that the value of the MLSA signal becomes minimum as described above like the conventional method, there maybe a case where the tracking control becomes unstable since the amplitude of the TE signal is insufficiently small to perform the tracking control. In order to solve this problem, it is necessary to search a point at which the value of the MLSA signal becomes minimum within a region where the amplitude of the TE signal is sufficiently high and the amplitude of the TE signal is slowly decreased.

As shown in FIG. 2b, there exists a relationship between the focus position of the light beam and the spherical aberration amount, where the amplitude of the TE signal is sufficiently high and the amplitude of the TE signal is slowly decreased. In FIG. 2b, a bold dotted line represents a set of points (i.e. a plurality of sets of the focus positions of the light beam and the spherical aberration amounts) where the amplitude of the TE signal is sufficiently high and the amplitude of the TE signal is slowly decreased. Hereinafter, the bold dotted line shown in FIG. 2b is referred to as a ridge line 22 of the amplitude of the TE signal. When the focus position of the light beam and the spherical aberration amount are on the ridge line 22 of the amplitude of the TE signal, the amplitude of the TE signal is sufficiently high and the amplitude of the TE signal is slowly decreased. In FIG. 2a, a bold dotted line represents a ridge line 22 of the amplitude of the TE signal. The point at which the value of the MLSA signal becomes minimum exists in the neighborhood of the ridge 22 of the amplitude of the TE signal.

Referring to FIG. 2b, the ridge 22 of the amplitude of the TE signal is detected from the amplitude characteristic of the TE signal in a state where the tracking control is not operated (i.e. the tracking control is in the off-state) and the detected ridge 22 of the amplitude of the TE signal is stored. Then, as shown in FIG. 2a, a point L3 at which the value of the MLSA signal becomes minimum is searched by changing the focus position of the light beam and the spherical aberration amount along the detected ridge 22 of the amplitude of the TE signal in a state where the tracking control is operated (i.e. the tracking control is in the on-state).

Figure 3:
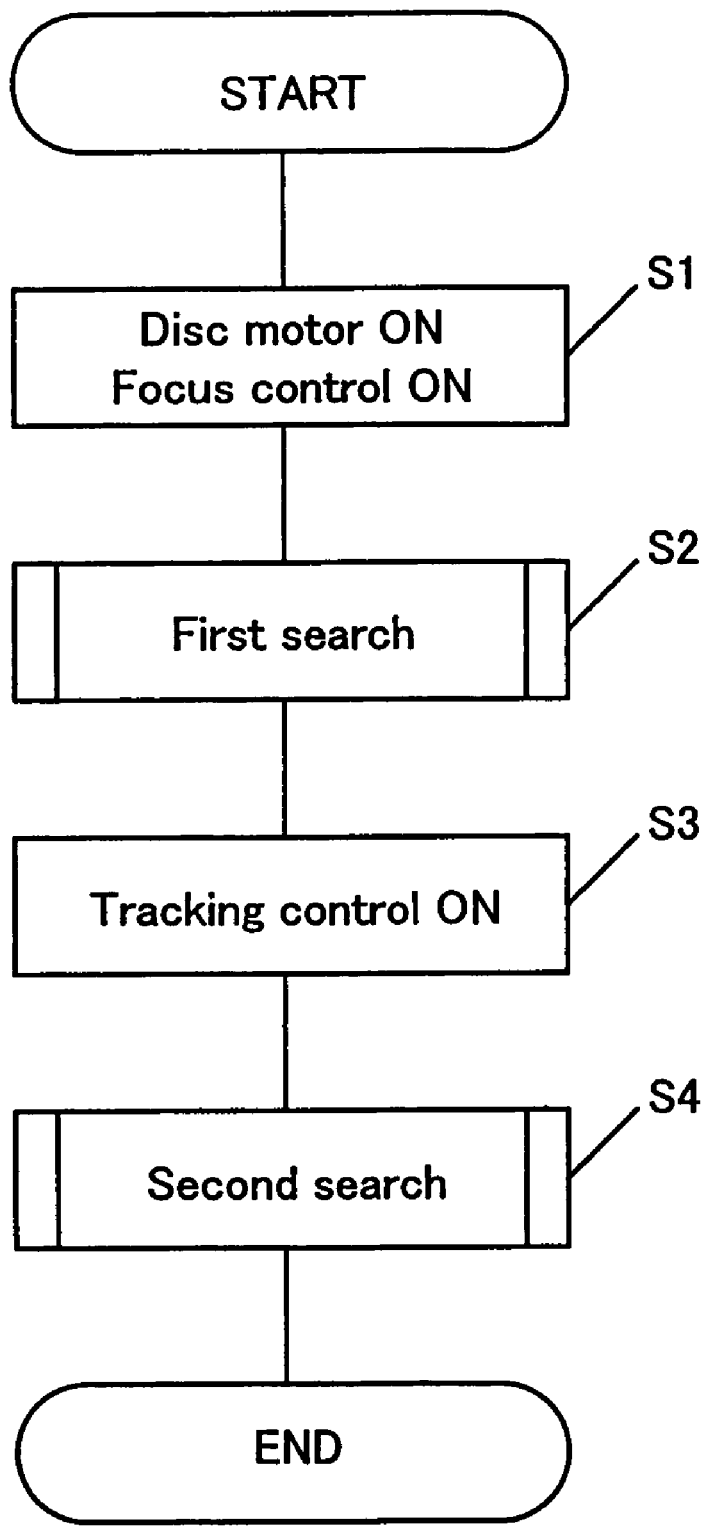
FIG. 3 is a flowchart showing a procedure of a method for searching a point L3 at which the value of the MLSA signal becomes minimum.

FIG. 3 shows a procedure of a method for searching a point L3 at which the value of the MLSA signal becomes minimum. This method is performed, for example, in the form of a program executed by the microcomputer 27.

Step S1: The microcomputer 27 controls the disc motor 12 to rotate the optical disc 13 and controls the control section to operate the focus control.

Step S2: The microcomputer 27 performs a first search for searching for a ridge line 22 of the amplitude of the TE signal in a state where the tracking control is not operated.

Step S3: The microcomputer 27 controls the control section to operate the tracking control.

Step S4: The microcomputer 27 performs a second search for determining a set of the focus position of the light beam and the spherical aberration amount such that the reproduced signal quality is optimal, among a plurality of sets of the focus positions of the light beam and the spherical aberration amounts which are located on the ridge line 22 of the amplitude of the TE signal which has searched in the first search.

Hereinafter, the first search (step S2 of FIG. 3) will be described with reference to FIG. 2b.

Figure 4:
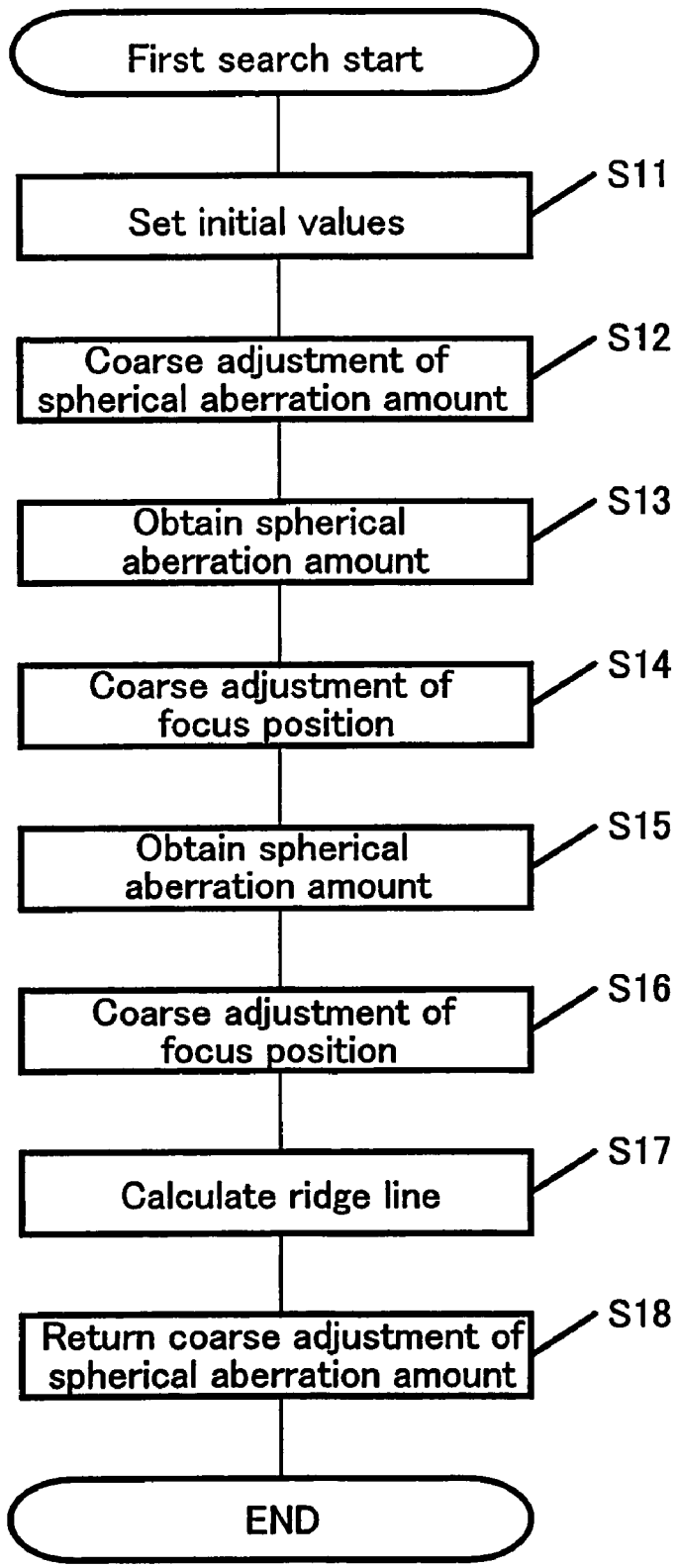
FIG. 4 is a flowchart showing a procedure of a method for performing the first search.

FIG. 4 shows a procedure of a method for performing the first search (step S2 of FIG. 3). This method is performed, for example, in the form of a program executed by the microcomputer 27.

Step S11: The focus position of the light beam is set to a predetermined initial value D1 and the spherical aberration amount is set to a predetermined initial value C0.

The initial value D1 of the focus position of the light beam may be an optimal value for a standard optical disc 13, or may be a value such that the amplitude of the FE signal becomes maximum. The initial value C0 of the spherical aberration amount may be an optimal value for a standard optical disc 13. The initial value D1 and the initial value C0 may be optimal values which may be varied for each optical pickup 4, since these initial values depend on the characteristic of the optical pickup 4.

Step S12: The spherical aberration amount C1 is searched such that the amplitude of the TE signal is maximum by changing the spherical aberration amount while maintaining the focus position of the light beam at a predetermined value D1. This step is called a coarse adjustment of the spherical aberration amount.

The point (D1, C1) is stored as the point L0 in a memory (not shown). The memory is provided within the microcomputer 27, for example.

Figure 11:
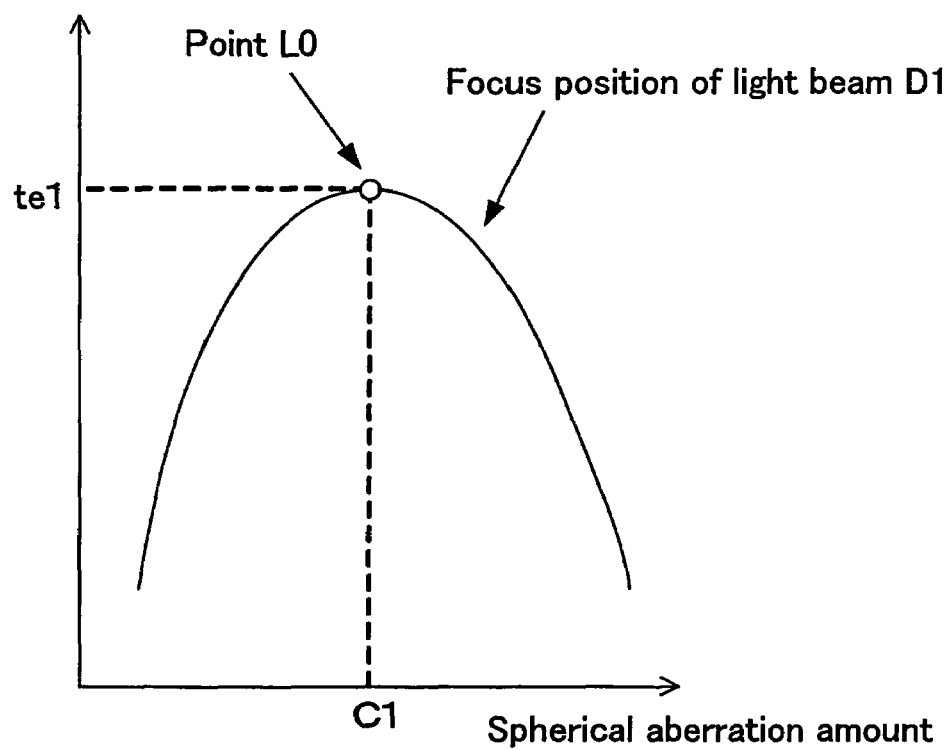
FIG. 11 is a view showing the amplitude characteristic of the TE signal with respect to the spherical aberration amount.

FIG. 11 shows a change in the amplitude of the TE signal while performing a search at step S12 shown in FIG. 4. In FIG. 11, the lateral axis indicates a spherical aberration amount and the vertical axis indicates the amplitude of the TE signal. In an example shown in FIG. 11, the amplitude of the TE signal has a maximum value te1 at the spherical aberration amount C1.

Step S13: The spherical aberration amount C2 is obtained by shifting the spherical aberration amount C1 obtained in step S12 in a positive direction by a predetermined amount.

Step S14: The focus position of the light beam D2 is searched such that the amplitude of the TE signal is maximum by changing the focus position of the light beam while maintaining the spherical aberration amount at a predetermined value C2. This step is called a coarse adjustment of the focus position of the light beam.

The point (D2, C2) is stored as the point L1 in a memory (not shown). The memory is provided within the microcomputer 27, for example.

Figure 12A:
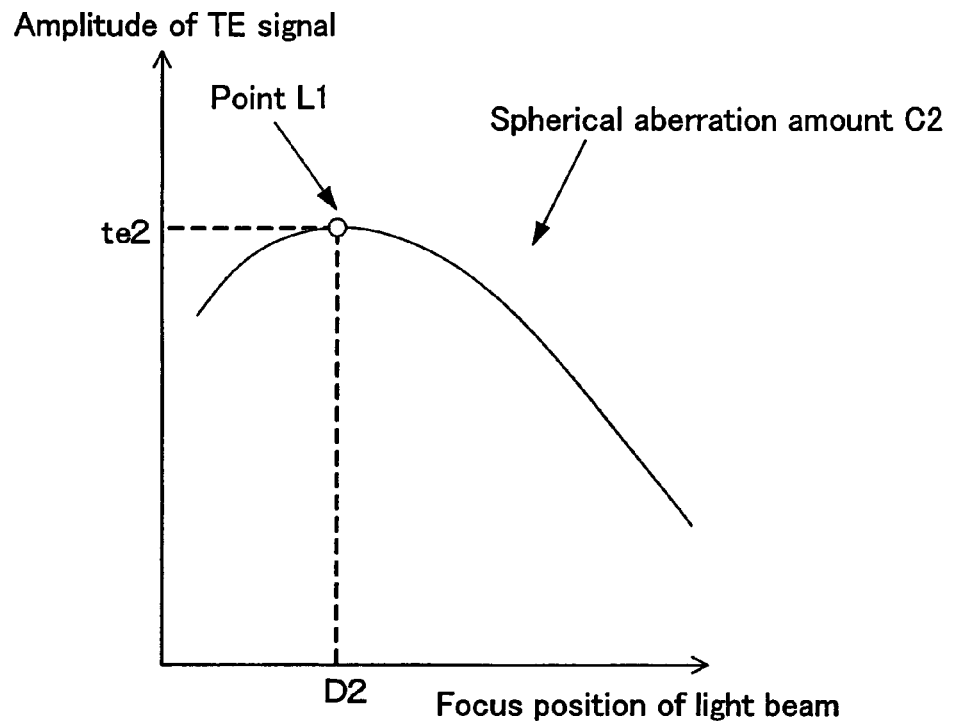
FIG. 12a is a view showing the amplitude characteristic of the TE signal with respect to the focus position of the light beam.

FIG. 12a shows a change in the amplitude of the TE signal while performing a search at Step S14 shown in FIG. 4. In FIG. 12a, the lateral axis indicates a focus position of the light beam and the vertical axis indicates the amplitude of the TE signal. In an example shown in FIG. 12a, the amplitude of the TE signal has a maximum value te2 at the focus position of the light beam D2.

Step S15: The spherical aberration amount C3 is obtained by shifting the spherical aberration amount C1 obtained in Step S12 in a negative direction by a predetermined amount.

Step S16: The focus position of the light beam D3 is searched such that the amplitude of the TE signal is maximum by changing the focus position of the light beam while maintaining the spherical aberration amount at a predetermined value C3. This step is called a coarse adjustment of the focus position of the light beam.

The point (D3, C3) is stored as the point L2 in a memory (not shown). The memory is provided within the microcomputer 27, for example.

Figure 12B:
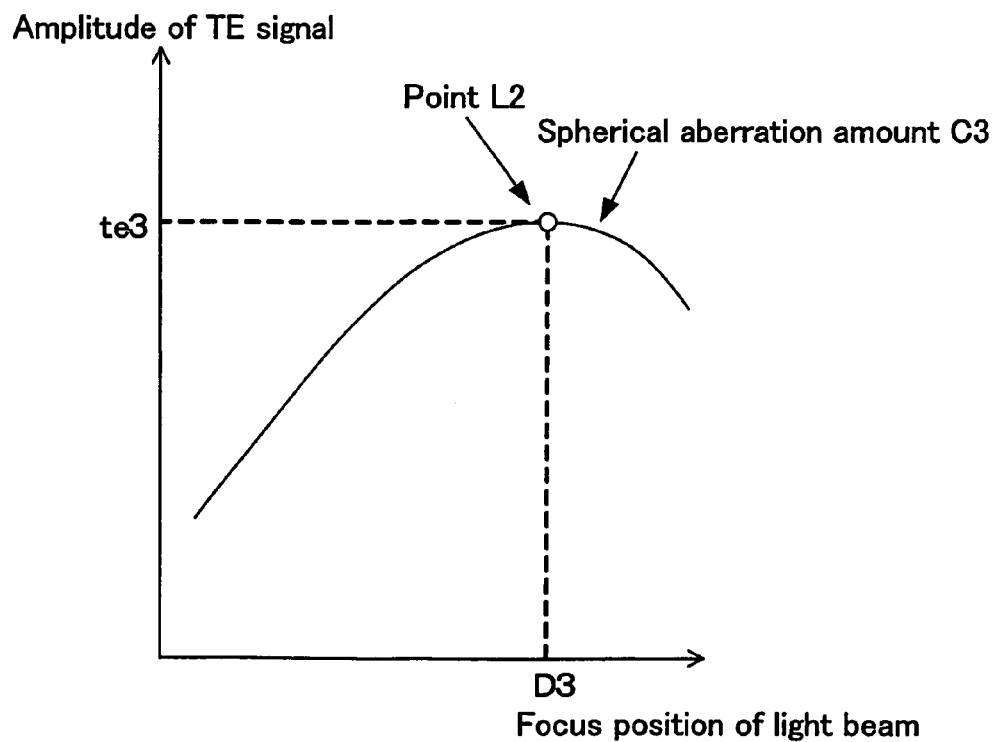
FIG. 12b is a view showing the amplitude characteristic of the TE signal with respect to the focus position of the light beam.

FIG. 12b shows a change in the amplitude of the TE signal while performing a search at Step S16 shown in FIG. 4. In FIG. 12b, the lateral axis indicates a focus position of the light beam and the vertical axis indicates the amplitude of the TE signal. In an example shown in FIG. 12b, the amplitude of the TE signal has a maximum value te3 at the focus position of the light beam D3.

Step S17: A line connecting the point L1 (D2, C2) and the point L2 (D3, C3) is determined as a ridge line 22 of the amplitude of the TE signal. The ridge line 22 is stored in a memory (not shown). The memory is provided within the microcomputer 27, for example.

The procedure from Step S15 to Step S16 may be performed prior to performing the procedure from step S13 to Step S14.

Step S18: The point L0 (D1, C1) is read out from the memory. The focus position of the light beam is set to a predetermined value D1 and the spherical aberration amount is set to a predetermined value C1.

The search for the spherical aberration amount C1 in step S12 is achieved, for example, by approximating a relationship between the spherical aberration amount and the amplitude of the TE signal using a quadratic curve; and determining the spherical aberration amount such that the amplitude of the TE signal becomes maximum based on the quadratic curve. Alternatively, the search for the spherical aberration amount C1 in step S12 may be achieved by determining a first spherical aberration amount such that the amplitude of the TE signal becomes maximum; determining two spherical aberration amounts (i.e. a second spherical aberration amount and a third spherical aberration amount) on both sides of the first spherical aberration amount such that the amplitude of the TE signal is lowered by a predetermined value from the maximum value; and calculating a mean value of the second spherical aberration amount and the third spherical aberration amount.

Similarly, the search for the focus position of the light beam D2 in step S14 is achieved, for example, by approximating a relationship between the focus position of the light beam and the amplitude of the TE signal using a quadratic curve; and determining the focus position of the light beam such that the amplitude of the TE signal becomes maximum based on the quadratic curve. Alternatively, the search for the focus position of the light beam D2 in step S14 may be achieved by determining a first focus position of the light beam such that the amplitude of the TE signal becomes maximum; determining two focus positions of the light beam (i.e. a second focus position of the light beam and a third focus position of the light beam) on both sides of the first focus position of the light beam such that the amplitude of the TE signal is lowered by a predetermined value from the maximum value; and calculating a mean position of the second focus position of the light beam and the third focus position of the light beam.

Similarly, the search for the focus position of the light beam D3 in step S16 can be achieved in a similar way as the search for the focus position of the light beam D2 in step S14.

Hereinafter, the second search (step S4 of FIG. 3) will be described.

Prior to performing the second search, the state of the tracking control is switched from a state where the tracking control is not operated (i.e. the off-state of the tracking control) to a state where the tracking control is operated (i.e. the on-state of the tracking control) (step S3 of FIG. 3). Next, information is recorded on a plurality of predetermined successive tracks of the optical disc 13 while maintaining the focus position of the light beam at a predetermined value D1 and maintaining the spherical aberration amount at a predetermined value C1.

The second search is performed in a state where the tracking control is operated, using the tracks on which the information has been recorded.

In FIG. 2a, a bold dotted line represents a ridge line 22 of the amplitude of the TE signal which has been searched in the first search. In FIG. 2a, a "stress A direction" is referred to as a direction along the ridge line 22 of the amplitude of the TE signal. In the second search, the point L3 is searched such that the value of the MLSA signal becomes minimum (i.e. the reproduced signal quality index becomes optimal) by changing the focus position of the light beam and the spherical aberration amount along the stress A direction.

Herein, for the point L3, the focus position of the light beam is set to a predetermined value D4, and the spherical aberration amount is set to a predetermined value C5.

Figure 13:
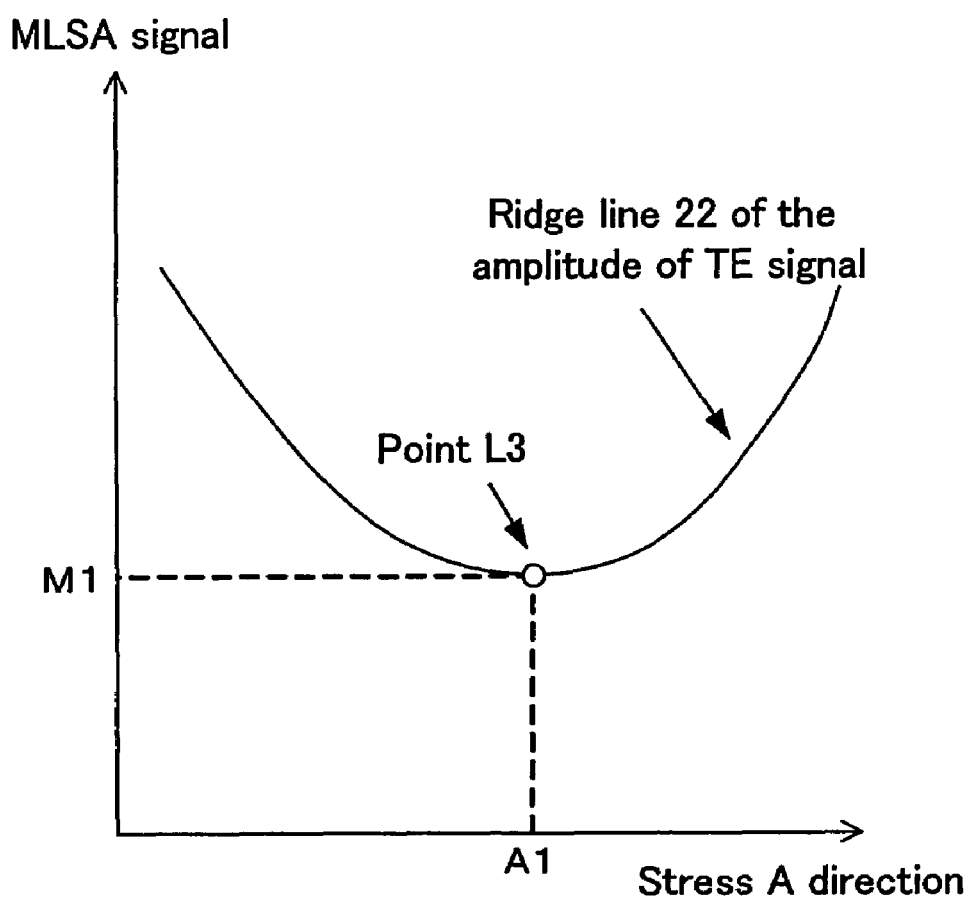
FIG. 13 is a view showing the characteristic of the MLSA signal on the ridge line of the amplitude of the TE signal.
Figure 14A:
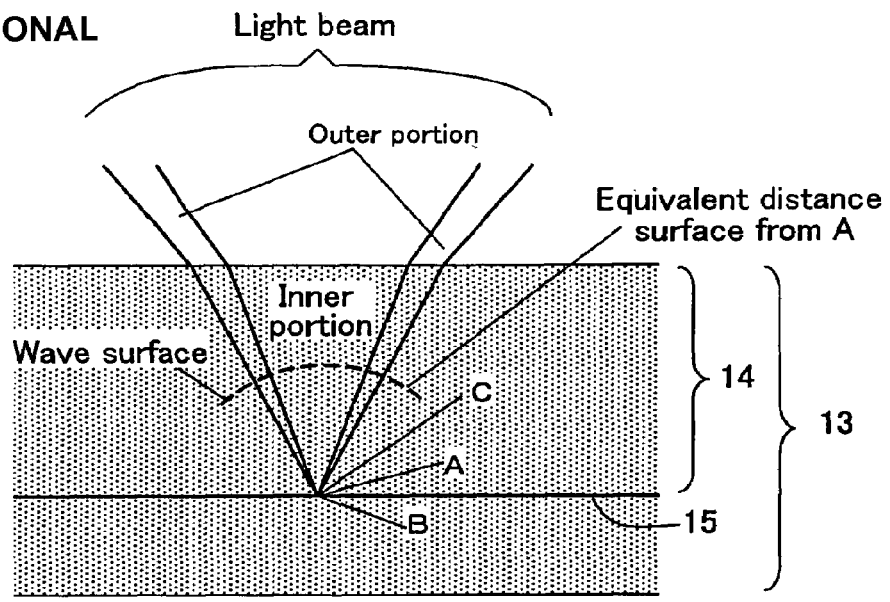
FIG. 14a is a cross-sectional view of a light beam for explaining a spherical aberration.
Figure 14B:
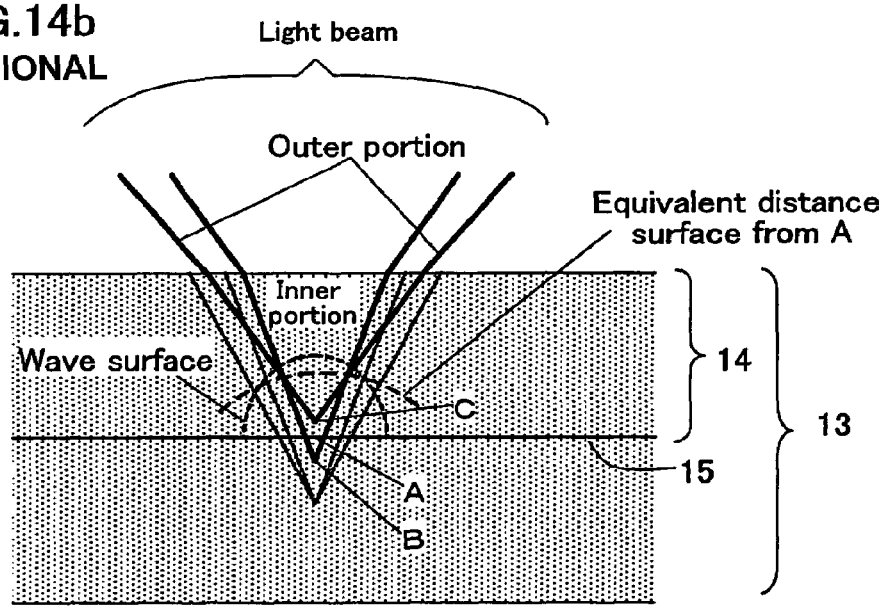
FIG. 14b is a cross-sectional view of a light beam for explaining a spherical aberration.

FIG. 13 shows a change in the MLSA signal while performing a search along the stress A direction shown in FIG. 2a. In FIG. 13, the lateral axis indicates a position along the stress A direction and the vertical axis indicates the MLSA signal. In an example shown in FIG. 13, the MLSA signal has a minimum value M1 at a position A1 on the ridge 22 along the stress A direction.

The search for a position along the stress A direction (i.e. a set of the focus position of the light beam and the spherical aberration amount) such that the value of the MLSA signal becomes approximately minimum is achieved, for example, by approximating a relationship between the position along the stress A direction and the MLSA signal using a quadratic curve; and determining the position along the stress A direction such that the value of the MLSA signal becomes minimum based on the quadratic curve. Alternatively, the search for a position along the stress A direction (i.e. a set of the focus position of the light beam and the spherical aberration amount) such that the value of the MLSA signal becomes approximately minimum may be achieved by determining a first position along the stress A direction such that the value of the MLSA signal becomes minimum; determining two positions along the stress A direction (i.e. a second position along the stress A direction and a third position along the stress A direction) on both sides of the first position along the stress A direction such that the value of the MLSA signal is increased by a predetermined value from the minimum value; and calculating a mean position of the second position along the stress A direction and the third position along the stress A direction.

Figure 5:
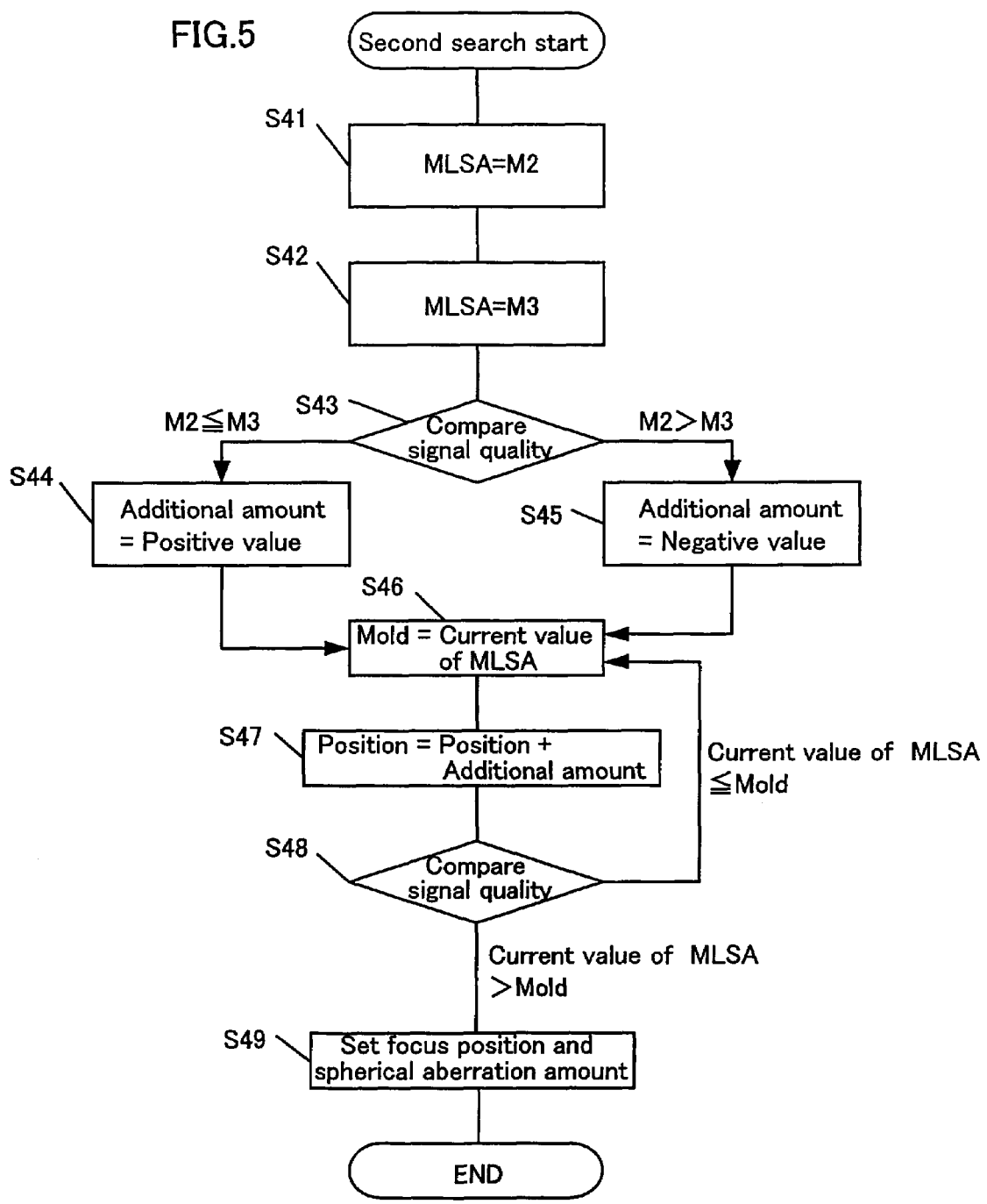
FIG. 5 is a flowchart showing a procedure of a method for performing the second search.

FIG. 5 shows a procedure of a method for performing the second search (step S4 of FIG. 3). This method is performed, for example, in the form of a program executed by the microcomputer 27.

Step S41: The value of the MLSA signal is measured for the focus position of the light beam and the spherical aberration amount at the starting point of the second search. The measured value M2 of the MLSA signal is stored in a memory (not shown). The memory is provided within the microcomputer 27, for example.

Step S42: A negative offset along the stress A direction is added to the position along the stress A direction (i.e. a set of the focus position of the light beam and the spherical aberration amount located on the ridge line 22 of the amplitude of the TE signal). Then, the value of the MLSA signal is measured. The measured value M3 of the MLSA signal is stored in a memory (not shown). The memory is provided within the microcomputer 27, for example.

Step S43: The quality of the MLSA signal measured in step S41 is compared with the quality of the MLSA signal measured in step S42. This comparison is made by comparing the value M2 with the value M3. It is determined that the quality of the MLSA signal is high when the value of the MLSA signal is small.

If M2≦M3 in step S43, then the procedure goes to step S44. If M2>M3 in step S43, then the procedure goes to step S45.

Step S44: A positive predetermined value is set as an additional value. The position along the stress A direction is returned back to an initial position (i.e. a position where the value of the MLSA signal is M2). Then, the procedure goes to step S46.

Step S45: A negative predetermined value is set as an additional value. The position along the stress A direction is returned back to an initial position (i.e. a position where the value of the MLSA signal is M2). Then, the procedure goes to step S46.

Step S46: The current value of the MLSA signal corresponding to the current position along the stress A direction is stored as a value of the variable Mold in a memory (not shown). The memory is provided within the microcomputer 27, for example.

Step S47: The current position along the stress A direction is updated to a next position along the stress A direction (i.e. a next set of the focus position of the light beam and the spherical aberration amount located on the ridge line 22 of the amplitude of the TE signal). The next position along the stress A direction is obtained by adding the additional value which is set in step S45 or step S46 to the value corresponding to the current position along the stress A direction. Then, the value of the MLSA signal is measured for the next position along the stress A direction. The measured value of the MLSA signal is stored as a current value of the MLSA signal corresponding to the current position along the stress A direction in a memory (not shown). The memory is provided within the microcomputer 27, for example.

Step S48: The quality of the MLSA signal measured in step S47 is compared with the quality of the MLSA signal measured in step S46. This comparison is made by comparing the current value of the MLSA signal which is stored in the memory in step S47 with the value of the variable Mold which is stored in the memory in step S46.

If the current value of the MLSA signal < the value of the variable Mold in step S48, then the procedure returns back to step S46. In step S46, the value of the variable Mold is updated to the current value of the MSLA signal which is stored in the memory in step S47.

If the current value of the MLSA signal > the value of the variable Mold in step S48, then the procedure goes to step S49.

Thus, by repeating the procedure from step S46 to step S48, if necessary, the position along the stress A direction such that the value of the MLSA signal becomes minimum can be determined.

Step S49: The position along the stress A direction such that the value of the MLSA signal becomes minimum (i.e. a set of the focus position of the light beam D4 and the spherical aberration amount C5) is stored as the point L3 in a memory (not shown). The memory is provided within the microcomputer 27, for example.

The microcomputer 27 controls the control section 6 such that the focus position of the light beam is set to a predetermined value D4, and controls the beam expander driving circuit 26 such that the spherical aberration amount is set to a predetermined value C5. As a result, the recording or the reproduction for the optical disc 13 is made with maintaining the focus position of the light beam at the predetermined value D4 and maintaining the spherical aberration amount at the predetermined value C5.

Thus, in a first search, a region where the amplitude of the TE signal is slowly decreased is determined as a ridge line, and then, in a second search, a set of the focus position of the light beam and the spherical aberration amount such that the reproduced signal quality becomes optimal is determined among a plurality of sets of the focus positions of the light beam and the spherical aberration amounts located on the ridge line. These are two-dimensional and two-step searches. This makes it possible to adjust the focus position of the light beam and the spherical aberration amount such that the reproduced signal quality becomes substantially optimal while maintaining the stability of the tracking control. As a result, the recording or the reproduction of the optical disc 13 can be securely performed.

In this embodiment, information is recorded on tracks, and the second search is performed using the tracks. However, the step of recording information on the tracks can be omitted, when the second search is performed using the tracks on which information has already been recorded in advance.

Due to some reasons such as fluctuations occurring while fabricating the optical pickup 4, a case may occur where the ridge line 22 of the amplitude of the TE signal is shifted from the point at which the reproduced signal quality becomes optimal. In this case, it is preferable to further adjust at least one of the focus position of the light beam and the spherical aberration amount such that the reproduced signal quality becomes optimal.

Figure 6:
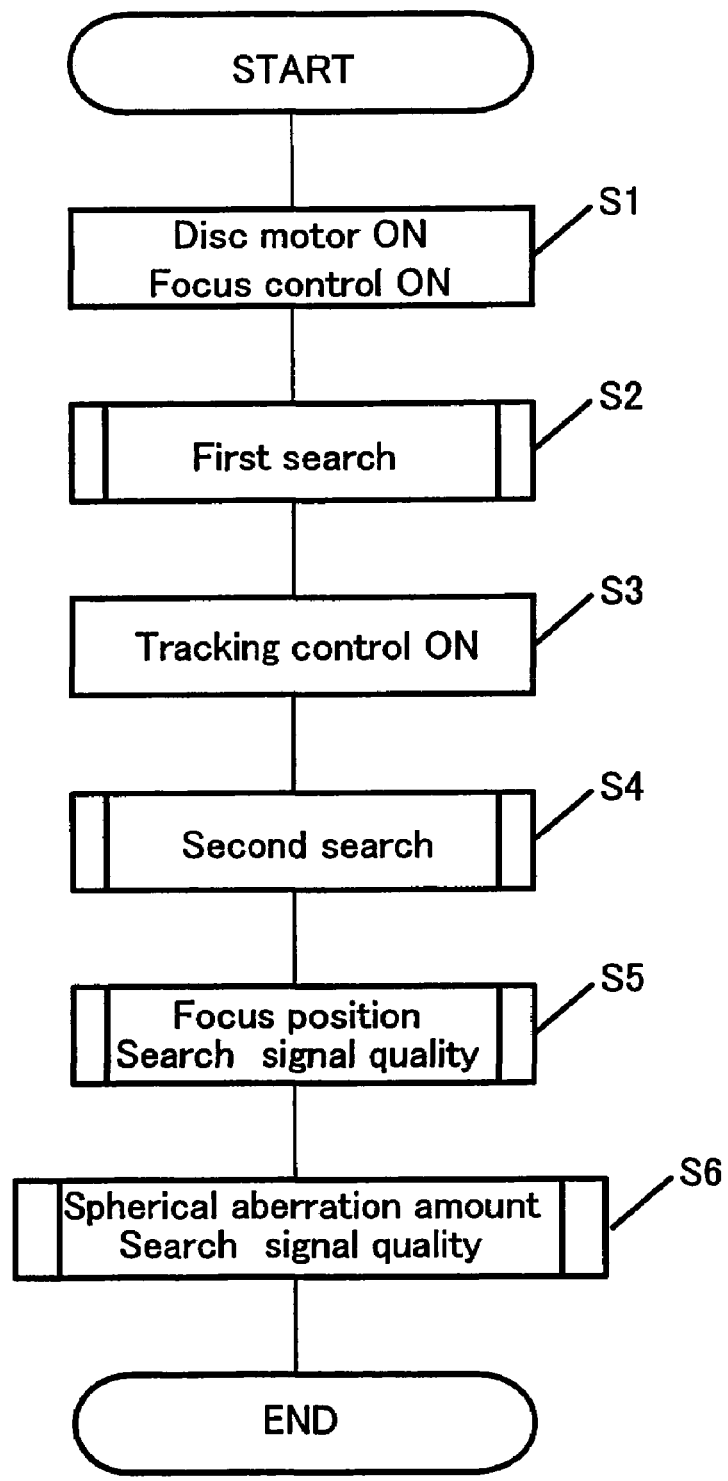
FIG. 6 is a flowchart showing a procedure of a method for further adjusting the position of the point L3 in the case where the ridge line 22 of the amplitude of the TE signal is shifted from the point at which the reproduced signal quality becomes optimal.

FIG. 6 shows a procedure of a method for further adjusting the position of the point L3 in the case where the ridge line 22 of the amplitude of the TE signal is shifted from the point at which the reproduced signal quality becomes optimal. This method is performed, for example, in the form of a program executed by the microcomputer 27.

In FIG. 6, steps S1 to S4 are identical to steps S1 to S4 shown in FIG. 3. Therefore, the description of these steps are omitted herein.

The point L3 (see FIG. 2a) obtained in step S4 may be separate from the point at which the value of the MLSA signal becomes minimum, as shown in FIG. 2c. In this case, step S5 and step S6 of FIG. 6 are performed in order to further adjust the position of the point L3.

Step S5: The focus position of the light beam D5 is searched such that the value of the MLSA signal becomes minimum, by changing the focus position of the light beam while maintaining the spherical aberration amount at a predetermined value C5 with reference to the point L3 as a reference point. See FIG. 2c.

The point (D5, C5) is stored as a point L4 in a memory (not shown). The memory is provided within the microcomputer 27, for example.

The search for the focus position of the light beam D5 is achieved, for example, by approximating a relationship between the focus position of the light beam and the MLSA signal using a quadratic curve; and determining the focus position of the light beam such that the value the MLSA signal becomes minimum based on the quadratic curve. Alternatively, the search for the focus position of the light beam D5 may be achieved by determining a first focus position of the light beam such that the value of the MLSA signal becomes minimum; determining two focus positions of the light beam (i.e. a second focus position of the light beam and a third focus position of the light beam) on both sides of the first focus position of the light beam such that the value of the MLSA signal is increased by a predetermined value from the minimum value; and calculating a mean position of the second focus position of the light beam and the third focus position of the light beam.

Step S6: The spherical aberration amount C6 is searched such that the value of the MLSA signal becomes minimum, by changing the spherical aberration amount while maintaining the focus position of the light beam at a predetermined value D5 with reference to the point L4 as a reference point. See FIG. 2c.

The point (D5, C6) is stored as a point L5 in a memory (not shown). The memory is provided within the microcomputer 27, for example.

The search for the spherical aberration amount C6 is achieved, for example, by approximating a relationship between the spherical aberration amount and the MLSA signal using a quadratic curve; and determining the spherical aberration amount such that the value of the MLSA signal becomes minimum based on the quadratic curve. Alternatively, the search for the spherical aberration amount C6 may be achieved by determining a first spherical aberration amount such that the value of the MLSA signal becomes minimum; determining two spherical aberration amounts (i.e. a second spherical aberration amount and a third spherical aberration amount) on both sides of the first spherical aberration amount such that the value of the MLSA signal is increased by a predetermined value from the minimum value; and calculating a mean value of the second spherical aberration amount and the third spherical aberration amount.

Thus, even if the ridge line 22 of the amplitude of the TE signal is shifted from the point at which the reproduced signal quality becomes optimal, the focus position of the light beam and the spherical aberration amount can be adjusted such that the reproduced signal quality becomes optimal.

In this case, since the search is performed in a direction away from the ridge line 22 of the amplitude of the TE signal, there is a possibility for slightly reducing the stability of the tracking control. However, the search is performed with reference to the point L3 on the ridge line 22 of the amplitude of the TE signal as a starting point, the degradation of the amplitude of the TE signal while performing the search is much restricted. As a result, the stability of the tracking control can be maintained.

In an example shown in FIG. 6, both step S5 and step S6 are performed. However, it is possible to perform only one of step S5 and step S6, although the accuracy is slightly reduced. Further, the order of the step S5 and step S6 can be reversed.

In this embodiment, it is described that a MLSA signal is used as a signal quality index during the search for the focus position of the light beam and the spherical aberration amount. However, the present invention is not limited to this. As the signal quality index, each of an error rate, the amplitude of a reproduced signal and jitter can be used. Such jitter, an error rate and a reproduced signal can be obtained by reproducing tracks in which disc information, an address and data have been recorded, respectively, using an optical pickup.

Herein, jitter is referred to as a physical amount representing a time shift of information transitions in the reproduced signal. The jitter is closely related to an error rate indicating a probability at which an error occurs when information is read from an optical disc.

In this embodiment, in order to determine a ridge line 22 of the amplitude of the TE signal, it is described that the focus positions of the light beam D2 and D3 are searched such that the amplitude of the TE signal becomes maximum, by changing the focus positions of the light beam while maintaining the spherical aberration amount at a predetermined value C2 and maintaining the spherical aberration amount at a predetermined value C3, respectively. See steps S14 and S16, respectively.

However, it is possible that the spherical aberration amounts C2 and C3 are searched such that the amplitude of the TE signal becomes maximum, by changing the spherical aberration amount while maintaining the focus positions of the light beam at a predetermined value D2 and maintaining the focus positions of the light beam at a predetermined value D3, respectively. In this case, it is possible to determine a line connecting the point (D2, C2) and the point (D3, C3) as a ridge line 22 of the amplitude of the TE signal.

Further, in this embodiment, it is described that a ridge line of the amplitude of the TE signal is determined, and then a set of the focus positions of the light beam and the spherical aberration amount is determined among a plurality of sets of the focus positions of the light beam and the spherical aberration amount located on the ridge line such that the value of the MLSA signal becomes minimum.

However, the step of determining a ridge line of the amplitude of the TE signal can be omitted. For example, instead of determining a ridge line of the amplitude of the TE signal, it is possible to determine a two-dimensional range of the focus positions of the light beam and the spherical aberration amount such that the amplitude of the TE signal is greater than (alternatively, greater than or equal to) a predetermined value. In this case, a set of the focus positions of the light beam and the spherical aberration amount can be determined among a plurality of sets of the focus positions of the light beam and the spherical aberration amount located within the two-dimensional range such that the value of the MLSA signal becomes minimum.

Embodiment 2

An optical disc apparatus according to embodiment 2 of the present invention has a configuration which is the same as that of the optical disc apparatus shown in FIG. 1.

The characteristic of the MLSA signal and the amplitude characteristic of the TE signal with respect to the focus position of the light beam and the spherical aberration amount will be described below.

FIG. 2c shows the characteristic of the MLSA signal of the RF signal with respect to the focus position of the light beam and the spherical aberration amount. The lateral axis and the vertical axis shown in FIG. 2c are the same as those shown in FIG. 10. The value of the MLSA signal is represented by a contour line map including a plurality of concentric ellipses. The value of the MLSA signal on a contour line is constant. The value of the MLSA signal becomes smaller as the point on the map approaches the center of each ellipse. Accordingly, the value of the MLSA signal becomes minimum at approximately the center of each ellipse. A signal can be optimally reproduced using the focus position of the light beam and the spherical aberration amount such that the value of the MLSA signal becomes minimum.

The thickness of the protection layer 14 of the optical disc 13 may be varied due to fluctuations while fabricating the optical disc 13. For example, when the optical disc 13 is a Blu-ray Disc, the variation of the thickness of the protection layer 14 is allowed to be within a range of ±5 μm according to the Blu-ray Disc Standard.

The variation of the thickness of the protection layer 14 causes a spherical aberration in a spot of the light beam on the information surface of the optical disc 13.

Further, even if the thickness of the protection layer 14 is not varied, a spherical aberration may be caused in a spot of the light beam on the information surface of the optical disc 13 due to fluctuations while fabricating the optical pickup 4.

Mainly due to the two reasons mentioned above, a spherical aberration may be caused in a spot of the light beam on the information surface of the optical disc 13. Due to such a spherical aberration, as shown in FIG. 2c, the point L4 (the spherical aberration C5) is shifted from the point L5 (the spherical aberration C6) at which the reproduced signal quality becomes maximum. As a result, the reproduced signal quality is degraded. Since the point at which the recording performance becomes optimal is almost the same as the point at which the reproduced signal quality becomes optimal, the recording performance is also degraded as the reproduced signal quality is degraded.

In order to solve this problem, the point L5 is searched such that the value of the MLSA signal indicating the reproduced signal quality becomes minimum by changing the spherical aberration in a state where the focus control is operated and the tracking control is operated (i.e. the on-state of the focus control and the on-state of the tracking control). See FIG. 2c.

The search for the point L5 is achieved, for example, by approximating a relationship between the spherical aberration amount and the MLSA signal using a quadratic curve; and determining the spherical aberration amount such that the value of the MLSA signal becomes minimum based on the quadratic curve. Alternatively, the search for the point L5 may be achieved by determining a first spherical aberration amount such that the value of the MLSA signal becomes minimum; determining two spherical aberration amounts (i.e. a second spherical aberration amount and a third spherical aberration amount) on both sides of the first spherical aberration amount such that the value of the MLSA signal is increased by a predetermined value from the minimum value; and calculating a mean value of the second spherical aberration amount and the third spherical aberration amount.

Thus, even if a spherical aberration may be caused in a spot of the light beam on the information surface of the optical disc 13 due to fluctuations while fabricating the optical disc 13 and/or fluctuations while fabricating the optical pickup 4, it is possible to adjust the spherical aberration amount. As a result, the reproduced signal quality and the recording performance can be securely maintained.

In this embodiment, it is described that an MLSA signal is used as a signal quality index during the search for the spherical aberration amount. However, the present invention is not limited to this. As the signal quality index, each of an error rate, the amplitude of a reproduced signal and jitter can be used. Such jitter, an error rate and a reproduced signal can be obtained by reproducing tracks in which disc information, an address and data have been recorded, respectively, using an optical pickup.

Herein, jitter is referred to as a physical amount representing a time shift of information transitions in the reproduced signal. The jitter is closely related to an error rate indicating a probability at which an error occurs when information is read from an optical disc.

Embodiment 3

Figure 15:
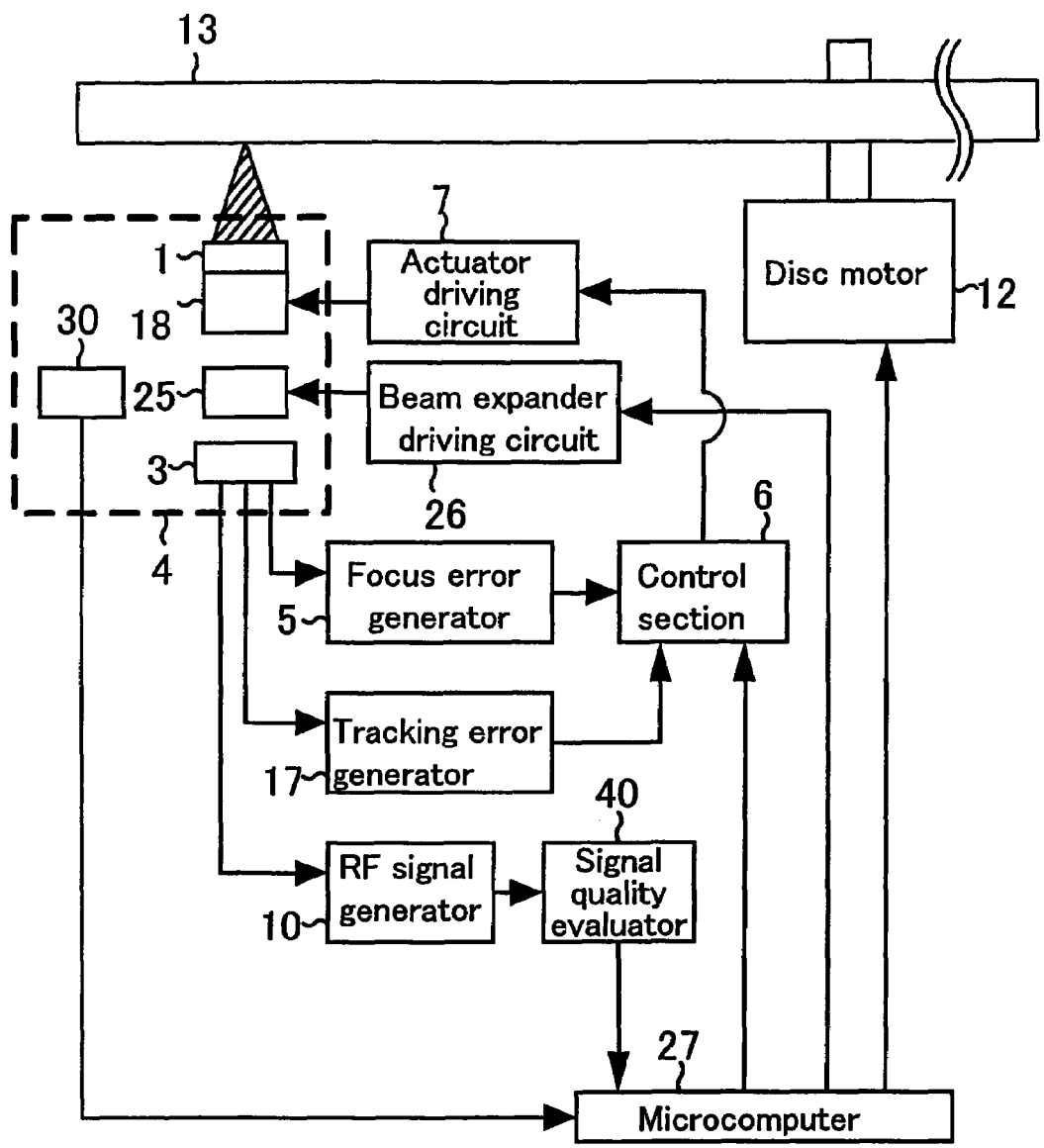
FIG. 15 is a block diagram showing a configuration of an optical disc apparatus according to embodiment 3 of the present invention.

FIG. 15 shows a configuration of an optical disc according to embodiment 3 of the present invention. In FIG. 5, the same reference numerals are applied to elements which are the same as those of the optical disc apparatus shown in FIG. 1, and the description of these elements are omitted herein.

A thermometer 30 measures an internal temperature of the optical pickup 4. The thermometer 30 is provided for the purpose of detecting a temperature change of a laser source (not shown) provided in the optical pickup 4. The thermometer 30 may directly detect a temperature change of the laser source by measuring the temperature of the laser source. Alternatively, the thermometer 30 may indirectly detect a temperature change of the laser source by placing the thermometer 30 at a position which is separate from the laser source within the optical pickup 4 and measuring the temperature of the internal temperature of the optical pickup 4.

Figure 17:
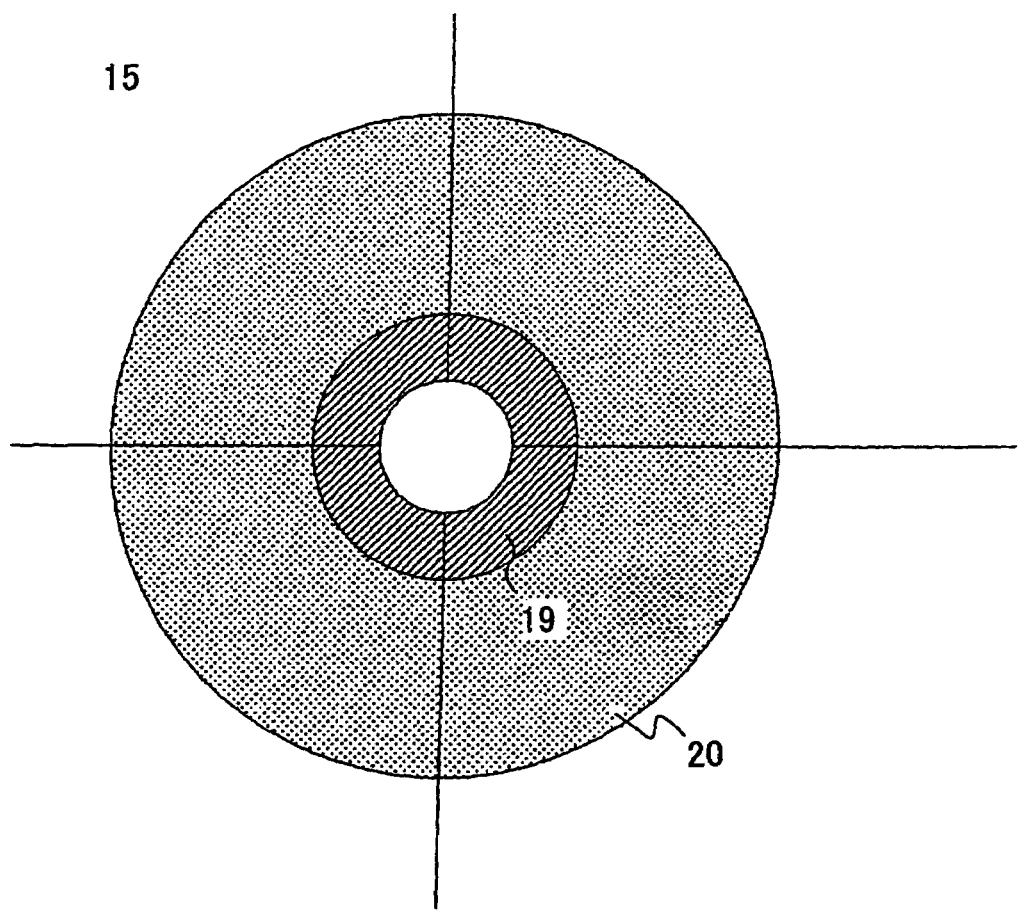
FIG. 17 is a view showing a structure of the information surface of the optical disc.

FIG. 17 shows a structure of the information surface 15 of the optical disc 13.

A system management area 19 is an area where a kind of the optical disc 13 and the capacity of the optical disc 13 are recorded. When the optical disc 13 is a recordable optical disc, the system management area 19 includes an area for adjusting a recording power and a recording waveform of the light beam. Since the system management area 19 is an area for managing the various settings of the optical disc apparatus and information of the optical disc 13, then basically, a user who uses an optical disc apparatus cannot intentionally access the system management area 19.

A user area 20 is an area where an electric data such as a video, a music and text is recorded or reproduced. The user can intentionally access the user area 20.

Figure 16:
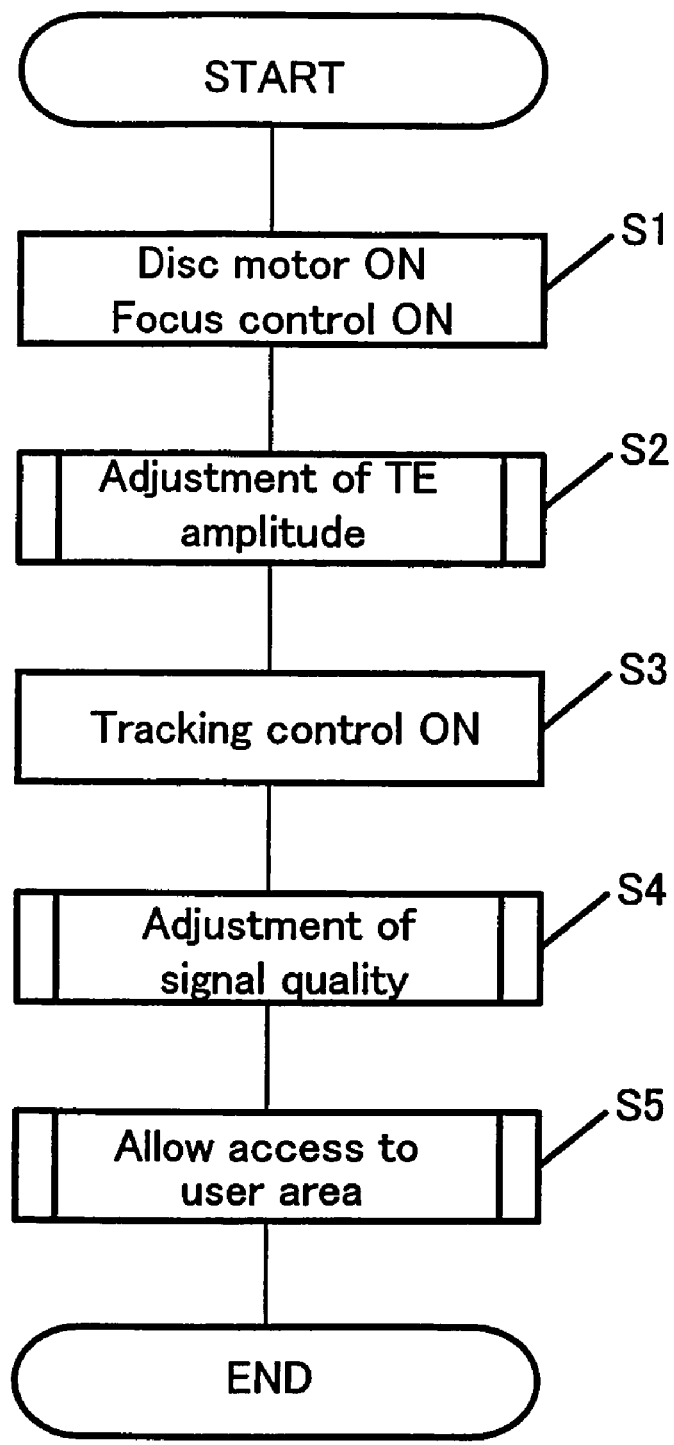
FIG. 16 is a flowchart showing a procedure of a method for initiating the optical disc apparatus.

FIG. 16 shows a procedure of a method for initiating the optical disc apparatus. This method is performed, for example, in the form of a program executed by the microcomputer 27.

Step S1: The microcomputer 27 controls the disc motor 12 to rotate the optical disc 13 and controls the control section 6 to operate the focus control.

The control section 6 receives, from the focus error generator 5, a FE signal indicating a positional shift along a vertical direction between the information surface 15 of the optical disc 13 and the spot of the light beam, and controls the actuator driving circuit 7 in accordance with the FE signal, such that the objective lens actuator 18 is driven to move the objective lens 1 along a direction which is perpendicular to the information surface 15 of the optical disc 13.

Thus, the positional shift along a vertical direction between the information surface 15 of the optical disc 13 and the spot of the light beam is controlled by the focus control.

Step S2: The microcomputer 27 measures the amplitude of the TE signal by changing the focus position of the light beam and the spherical aberration amount, and determines a condition for the focus position of the light beam and the spherical aberration amount such that the TE signal can have an amplitude which is sufficiently great to perform the tracking control.

As a method for adjusting the amplitude of the TE signal, the method for performing the first search described in embodiment 1 can be applied. The details of this method are already described and therefore the description of this method is omitted herein.

Step S3: The microcomputer 27 controls the control section 6 to operate the tracking control, and moves the spot of the light beam to the recorded area on the information surface 15 of the optical disc 13.

The control section 6 receives, from the tracking error generator 17, a TE signal indicating a positional shift between the spot of the light beam and a track on the information surface 15 of the optical disc 13, and controls the actuator driving circuit 7 in accordance with the TE signal, such that the objective lens actuator 18 is driven to move the objective lens 1 along a radial direction of the information surface 15 (i.e. a direction perpendicular to the track).

Thus, the positional shift between the spot of the light beam and a track on the information surface 15 of the optical disc 13 is controlled by the tracking control.

The movement of the spot of the light beam to the recorded area of the information surface 15 is beyond a capability of the movement along a radial direction by the objective lens actuator 18. Accordingly, the movement is realized by moving the optical pickup 4 along a radial direction of the optical disc 13.

In a case where there is no recorded area on the information surface 15, a recorded area is created by performing the self-recording function, and a spot of the light beam is moved to the recoded area after creating the recorded area.

The self-recording function is performed to record information on a certain area within the system management area 19 in order to not destroy the user data recorded on the user area 20 shown in FIG. 17.

Step S4: The microcomputer 27 measures the reproduced signal quality by changing the focus position of the light beam and the spherical aberration amount, and determines a condition for the focus position of the light beam and the spherical aberration amount such that the reproduced signal quality becomes optimal.

As a method for adjusting the reproduced signal quality, the method for performing the second search described in embodiment 1 can be applied. The details of this method are already described and therefore the description of this method is omitted herein.

Step S5: The microcomputer 27 allows access to the user area 20, and terminates the procedure of initiating the optical disc apparatus.

After initiating the optical disc apparatus, it becomes possible for a user to access the user area 20. It is required to re-adjust the spherical aberration amount while accessing the user area 20 on the information surface 15 of the optical disc 13.

For example, in a case where it is required to access two or more points which have different radial positions within the user area 20, the thickness of the protection layer 14 at one position to be accessed may be different from the thickness of the protection layer 14 at the other position to be accessed. The protection layer 14 protects the information surface 15 of the optical disc 13. As a result, the spherical aberration amount generated at one position to be accessed is different from the spherical aberration amount generated at the other position to be accessed. This causes an error between the spherical aberration amount which is currently set and the optimal spherical aberration amount, thereby degrading the recording or reproduction performance.

In order to solve this problem, it is necessary to re-adjust the spherical aberration amount at each and every radius of the optical disc 13. Alternatively, the information surface 15 is divided into a plurality of areas in a radial direction, and the spherical aberration amount is adjusted separately for each of the divided areas.

Further, it is required to re-adjust the spherical aberration amount when the temperature within the optical pickup 4 has been changed.

Figure 18:
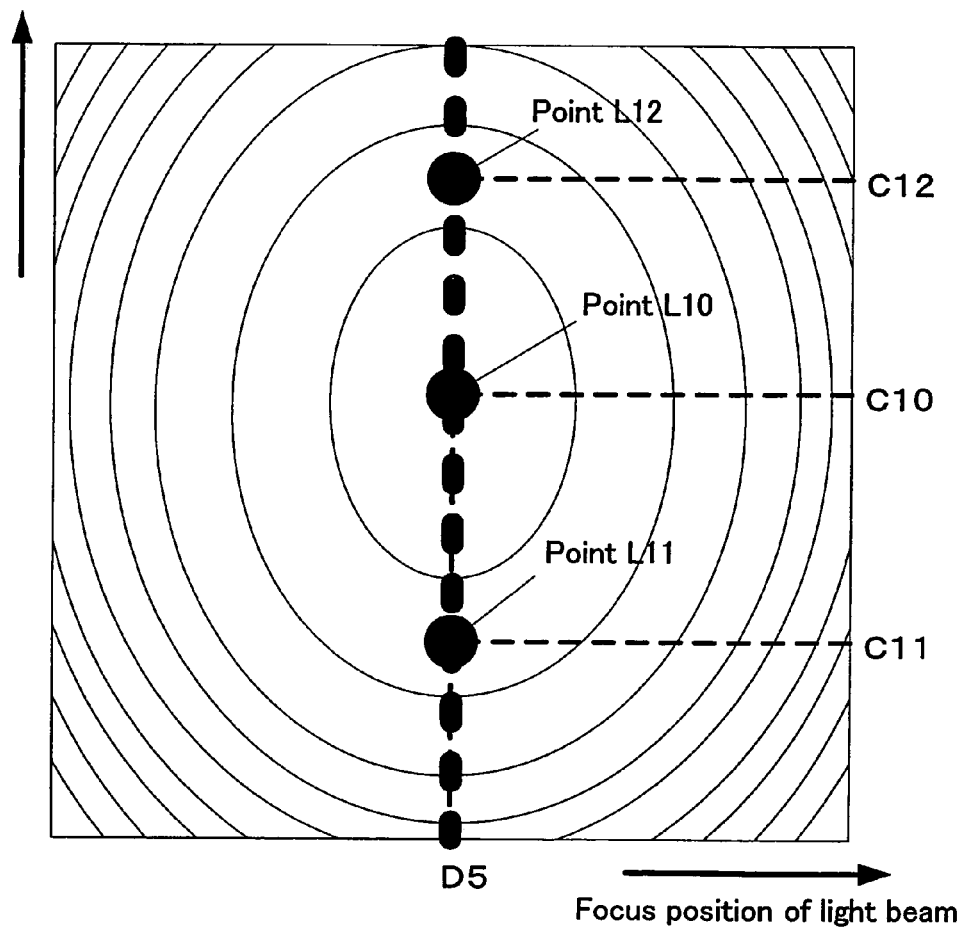
FIG. 18 is a view showing the characteristic of the MLSA signal with respect to the focus position of the light beam and the spherical aberration amount.

FIG. 18 shows the characteristics of the MLSA signal of the RF signal with respect to the focus position of the light beam and the spherical aberration amount. The lateral axis and the vertical axis shown in FIG. 2c are the same as those shown in FIG. 10. The value of the MLSA signal is represented by a contour line map including a plurality of concentric ellipses. The value of the MLSA signal on a contour line is constant. The value of the MLSA signal becomes smaller as the point on the map approaches the center of each ellipse. Accordingly, the value of the MLSA signal becomes minimum at approximately the center of each ellipse. A signal can be optimally reproduced using the focus position of the light beam and the spherical aberration amount such that the value of the MLSA signal becomes minimum.

In a case where the temperature of a laser source (not shown) provided in the optical pickup 4 is kept constant, the point L10 is a point where the reproduced signal quality becomes optimal (i.e. the value of the MLSA signal becomes minimum) after the focus control is operated and the tracking control is operated.

However, due to heat generated by the laser source or heat generated by elements external to the optical pickup 4 such as the actuator driving circuit 7, the beam expander driving circuit 26 and the disc motor 12, the temperature of the laser source is not kept constant and is varied.

As a result, the wavelength of the light beam emitted from the laser source is varied, and finally, the spherical aberration amount generated on the information surface 15 of the optical disc 13 is varied. For example, due to the temperature change, the point where the value of the MLSA signal becomes minimum is shifted from the point L10 (D5, C10) to the point L11 (D5, C11) or the point L12 (D5, C12).

As a result, the reproduced signal quality is degraded, and it is difficult to secure the reproduction performance. Since the condition in which the recording performance becomes optimal is almost the same as the condition in which the reproduced signal quality becomes optimal, the recording performance is also degraded as the reproduced signal quality is degraded, and it is difficult to secure the recording performance.

It is necessary to re-adjust the spherical aberration amount in accordance with the temperature change of the laser source.

FIG. 19 is a view for explaining a method for re-adjusting the spherical aberration amount.

As shown in FIG. 19, a relationship between the temperature and the spherical aberration amount is represented by a linear function. This relationship has the characteristic of high repeatability. The linear function is represented by an equation $C = K \times T + C0$, for example, wherein C denotes a spherical aberration amount, K denotes a sensitivity for the spherical aberration amount corresponding to the temperature change measured by the thermometer, T denotes a temperature measured by the thermometer, and C0 denotes a spherical aberration amount when the temperature measured by the thermometer is zero. The linear function can be stored in advance in the microcomputer 27.

After the focus control is operated and the tracking control is operated, the microcomputer 27 adjusts the focus position of the light beam and the spherical aberration amount such that the point corresponding to the focus position of the light beam and the spherical aberration amount conforms with the point L10 (D5, C10) at which the reproduced signal quality becomes optimal. The temperature measured by the thermometer 30 at this time is stored as a temperature T10 in a memory (not shown). The memory is provided within the microcomputer 27, for example.

The spherical aberration amount C0, which is a spherical aberration amount when the temperature measured by the thermometer is zero, is varied depending on the thickness of the protection layer 14 of the optical disc 13. The current value of the spherical aberration amount C0 corresponding to the current thickness of the protection layer 14 is calculated according to C10−K×T10, and then the calculated value is set to the spherical aberration amount C0 again.

The microcomputer 27 receives a temperature detected by the thermometer 30 at a predetermined timing such as every predetermined interval or when a predetermined temperature change occurs, calculates the spherical aberration amount C in accordance with the equation C=K×T+C0 which is stored therein, and sets the calculated value C to the spherical aberration amount.

For example, when the temperature T12 is detected by the thermometer 30, the microcomputer 27 calculates the spherical aberration amount C12 in accordance with the equation C12=K×T12+C0, and sets the calculated value C12 to the spherical aberration amount.

Similarly, when the temperature of the laser source is lowered, and then the temperature T11 is detected by the thermometer 30, the microcomputer 27 calculates the spherical aberration amount C11 in accordance with the equation C11=K×T11+C0, and sets the calculated value C11 to the spherical aberration amount.

By re-adjusting the spherical aberration amount as mentioned above, the spherical aberration amount generated on the information surface 15 of the optical disc 13 can be re-adjusted correctly in response to the temperature change of the laser source.

In summary, when the point where the value of the MLSA signal becomes minimum is shifted from the point L10 (D5, C10) to the point L11 (D5, C11) or the point L12 (D5, C12), the spherical aberration amount can be corrected such that the point corresponding to the focus position of the light beam and the spherical aberration amount conforms with the point L11 (D5, C10) or the point L12 (D5, C12).

As a result, the degradation of the reproduced signal quality can be avoided regardless of the temperature change of the laser source. Further, it is possible to secure the reproduction performance.

Since the condition in which the recording performance becomes optimal is almost the same as the condition in which the reproduced signal quality becomes optimal, the degradation of the recording performance can also be avoided. Further, it is possible to secure the recording performance.

The present invention is useful for an optical disc apparatus, an optical disc method and a semiconductor integrated circuit and the like capable of adjusting the focus position of the light beam and the spherical aberration amount such that the reproduced signal quality becomes optimal while maintaining the stability of the tracking control.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus, comprising:
a focus position changing section operable to change a focus position of a light beam with which an optical disc is irradiated;
a spherical aberration amount changing section operable to change a spherical aberration amount which is generated in a spot of the light beam formed on an information surface of the optical disc;
a tracking error detecting section for detecting a tracking error indicating a positional shift between the spot of the light beam and a track on the information surface of the optical disc and generating a tracking error signal indicating the tracking error;
a tracking control section for performing a tracking control in accordance with the tracking error signal;
a reproduced signal quality index generating section for generating a reproduced signal quality index indicating a quality of a reproduced signal from the information surface of the optical disc; and
a control section for controlling the focus position changing section, the spherical aberration amount changing section and the tracking control section;
wherein
the control section is operable to switch an on/off state of the tracking control,
the control section performs a first search while the tracking control is in the off state, the first search for searching for a plurality of sets of the focus positions of the light beam and the spherical aberration amounts such that an amplitude of the tracking error signal is greater than a predetermined value by controlling the focus position changing section to change the focus position of the light beam and controlling the spherical aberration amount changing section to change the spherical aberration amount, and
the control section performs a second search while the tracking control is in the on state, the second search for determining a set of the focus position of the light beam and the spherical aberration amount such that the reproduced signal quality index is substantially optimal, among the plurality of sets of the focus positions of the light beam and the spherical aberration amounts obtained in the first search.

2. An optical disc apparatus according to claim 1, wherein:
the control section searches for a ridge line of the amplitude of the tracking error signal during the first search.

3. An optical disc apparatus according to claim 2, wherein:
the control section determines a spherical aberration amount C2 such that an amplitude of the tracking error signal is substantially maximum, by controlling the spherical aberration amount changing section to change the spherical aberration amount while maintaining the focus position of the light beam at a predetermined value D2,
the control section determines a spherical aberration amount C3 such that an amplitude of the tracking error signal is substantially maximum, by controlling the spherical aberration amount changing section to change the spherical aberration amount while maintaining the focus position of the light beam at a predetermined value D3, and
the control section determines a line connecting a point L1 (D2, C2) and a point L2 (D3, C3) as the ridge line.

4. An optical disc apparatus according to claim 2, wherein:
the control section determines a focus position D2 of the light beam such that an amplitude of the tracking error signal is substantially maximum, by controlling the focus position changing section to change the focus position of the light beam while maintaining the spherical aberration amount at a predetermined value C2,
the control section determines a focus position D3 of the light beam such that an amplitude of the tracking error signal is substantially maximum, by controlling the focus position changing section to change the focus position of the light beam while maintaining the spherical aberration amount at a predetermined value C3, and
the control section determines a line connecting a point L1 (D2, C2) and a point L2 (D3, C3) as the ridge line.

5. An optical disc apparatus according to claim 1, wherein:
the control section performs a further search while the tracking control is in the on state, the further search for determining a focus position of the light beam such that the reproduced signal quality index is substantially optimal, by controlling the focus position changing section to change the focus position of the light beam which is determined in the second search while maintaining the spherical aberration amount which is determined in the second search.

6. An optical disc apparatus according to claim 1, wherein:
the control section performs a further search while the tracking control is in the on state, the further search for determining a spherical aberration amount such that the reproduced signal quality index is substantially optimal, by controlling the spherical aberration amount changing section to change the spherical aberration amount which is determined in the second search while maintaining the focus position of the light beam which is determined in the second search.

7. An optical disc apparatus according to claim 1, wherein:
the reproduced signal quality index generating section generates the reproduced signal quality index based on a jitter.

8. An optical disc apparatus according to claim 1, wherein:
the reproduced signal quality index generating section generates the reproduced signal quality index based on a MLSE (Maximum Likelihood Sequence Error) signal.

9. An optical disc apparatus according to claim 1, wherein:
the reproduced signal quality index generating section generates the reproduced signal quality index based on a SAM (Sequence Amplitude Margin) signal.

10. An optical disc apparatus according to claim 1, wherein:
the reproduced signal quality index generating section generates the reproduced signal quality index based on an amplitude of the reproduced signal.

11. An optical disc apparatus according to claim 1, wherein:
the reproduced signal quality index generating section generates the reproduced signal quality index based on an error rate.

12. An optical disc apparatus according to claim 1, wherein
the control section controls the spherical aberration amount changing section to change the spherical aberration amount, after it becomes possible to perform recording or reproduction for a user area on the information surface of the optical disc.

13. An optical disc apparatus according to claim 12, further comprising:
a temperature change detection section for directly or indirectly detecting a change in temperature of a source of the light beam,
wherein
the control section controls the spherical aberration amount changing section to change the spherical aberration amount in accordance with the change in temperature detected by the temperature change detection section.

14. An optical disc apparatus according to claim 12, further comprising:
a moving section for moving the spot of the light beam in a radial direction of the optical disc,
wherein
the control section controls the spherical aberration amount changing section to change the spherical aberration amount in accordance with a distance along the radial direction of the optical disc at which the spot of the light beam is moved by the moving section.

15. A method for adjusting a focus position of a light beam with which an optical disc is irradiated and a spherical aberration amount which is generated in a spot of the light beam formed on an information surface of the optical disc, the method comprising the steps of:
performing a first search while a tracking control is in the off state, the first search for searching for a plurality of sets of the focus positions of the light beam and the spherical aberration amounts such that an amplitude of a tracking error signal is greater than a predetermined value by changing the focus position of the light beam and changing the spherical aberration amount, and
performing a second search while the tracking control is in the on state, the second search for determining a set of the focus position of the light beam and the spherical aberration amount such that a reproduced signal quality index is substantially optimal, among the plurality of sets of the focus positions of the light beam and the spherical aberration amounts obtained in the first search.

16. A method according to claim 15, further comprising the step of:
performing a further search for determining a spherical aberration amount such that the reproduced signal quality index is substantially optimal while the tracking control is in the on state, by changing the spherical aberration amount which is determined in the second search while maintaining the focus position of the light beam which is determined in the second search.

17. A method according to claim 15, further comprising the step of:
changing the spherical aberration amount, after it becomes possible to perform recording or reproduction for a user area on the information surface of the optical disc.

18. A semiconductor integrated circuit for use in an optical disc apparatus, wherein the optical disc apparatus includes:

a focus position changing section operable to change a focus position of a light beam with which an optical disc is irradiated;

a spherical aberration amount changing section operable to change a spherical aberration amount which is generated in a spot of the light beam formed on an information surface of the optical disc;

a tracking error detecting section for detecting a tracking error indicating a positional shift between the spot of the light beam and a track on the information surface of the optical disc and generating a tracking error signal indicating the tracking error; and a tracking control section for performing a tracking control in accordance with the tracking error signal, the semiconductor integrated circuit comprising:

a reproduced signal quality index generating section for generating a reproduced signal quality index indicating a quality of a reproduced signal from the information surface of the optical disc; and a control section for controlling the focus position changing section, the spherical aberration amount changing section and the tracking control section;

wherein the control section is operable to switch an on/off state of the tracking control, the control section performs a first search while the tracking control is in the off state, the first search for searching for a plurality of sets of the focus positions of the light beam and the spherical aberration amounts such that an amplitude of the tracking error signal is greater than a predetermined value by controlling the focus position changing section to change the focus position of the light beam and controlling the spherical aberration amount changing section to change the spherical aberration amount, and the control section performs a second search while the tracking control is in the on state, the second search for determining a set of the focus position of the light beam and the spherical aberration amount such that the reproduced signal quality index is substantially optimal, among the plurality of sets of the focus positions of the light beam and the spherical aberration amounts obtained in the first search.

19. A semiconductor integrated circuit according to claim 18 wherein the control section performs a further search for determining a spherical aberration amount such that the reproduced signal quality index is substantially optimal while the tracking control is in the on state, by controlling the spherical aberration amount changing section to change the spherical aberration amount which is determined in the second search while maintaining the focus position of the light beam which is determined in the second search.

20. A semiconductor integrated circuit according to claim 18 wherein the control section controls the spherical aberration amount changing section to change the spherical aberration amount, after it becomes possible to perform recording or reproduction for a user area on the information surface of the optical disc.

\* \* \* \* \*